US012291035B2

(12) United States Patent
Miyachi

(10) Patent No.: US 12,291,035 B2
(45) Date of Patent: May 6, 2025

(54) INKJET PRINTER, FLOW PATH RESISTANCE ADJUSTMENT METHOD, AND PRINTING METHOD

(71) Applicant: RISO KAGAKU CORPORATION, Tokyo (JP)

(72) Inventor: Ryosuke Miyachi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 141 days.

(21) Appl. No.: 18/120,495

(22) Filed: Mar. 13, 2023

(65) Prior Publication Data

US 2023/0356530 A1 Nov. 9, 2023

(30) Foreign Application Priority Data

Mar. 28, 2022 (JP) ................................ 2022-051907
Mar. 28, 2022 (JP) ................................ 2022-052412

(51) Int. Cl.
*B41J 2/175* (2006.01)
*B41J 2/18* (2006.01)

(52) U.S. Cl.
CPC . *B41J 2/175* (2013.01); *B41J 2/18* (2013.01)

(58) Field of Classification Search
CPC ..... B41J 2/175; B41J 2/18; B41J 2/165; B41J 2/19; B41J 2/195; B41J 2/17556; B41J 29/38
See application file for complete search history.

(56) References Cited

U.S. PATENT DOCUMENTS 8,100,500 B2 * 1/2012 Bansyo .................... B41J 2/185 347/7
8,186,819 B2 * 5/2012 Kaiho ...................... B41J 29/38 347/85
8,235,494 B2 * 8/2012 Kaiho ...................... B41J 2/175 347/17
8,602,537 B2 * 12/2013 Katoh ...................... B41J 2/195 347/85

(Continued)

FOREIGN PATENT DOCUMENTS

JP 2018-1687 A 1/2018

OTHER PUBLICATIONS

Jul. 12, 2023 Extended European Search Report in corresponding European Appl. No. 23162306.7.

*Primary Examiner* — John Zimmermann
(74) *Attorney, Agent, or Firm* — GREENBLUM & BERNSTEIN P.L.C

(57) ABSTRACT

An inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and an ink path connecting the ink tank with the inkjet head. The printing is performed in a state where a parameter related to a flow path resistance of the ink path is set such that a nozzle pressure of each of the nozzles at a time of printing is within a prescribed range enabling ink to be stably ejected and ink flows at a flow rate required for the inkjet head.

23 Claims, 13 Drawing Sheets

(56) References Cited

U.S. PATENT DOCUMENTS

| | | | | |
|---|---|---|---|---|
| 8,833,897 | B2 * | 9/2014 | Murata | B41J 2/16535 347/17 |
| 2010/0177148 | A1 * | 7/2010 | Asami | B41J 2/18 347/85 |
| 2011/0279495 | A1 * | 11/2011 | Kuribayashi | B41J 2/17566 347/85 |
| 2012/0188314 | A1 * | 7/2012 | Akiyama | B41J 2/175 347/85 |
| 2014/0204413 | A1 | 7/2014 | Park et al. | |
| 2020/0079089 | A1 * | 3/2020 | Cai | B41J 2/165 |
| 2021/0060966 | A1 | 3/2021 | Koase et al. | |

* cited by examiner

FIG. 12

186

| | | HEIGHT POSITION OF HEAD UNIT | HEAD ANGLE | FLOW PATH RESISTANCE | | | |
|---|---|---|---|---|---|---|---|
| | | | | $R_{1k}$ | $R_{2k}$ | $R_{1f}$ | $R_{2f}$ |
| AT TIME OF PRINTING | INK UNIT 108A | $h_1$ | $d_1$ | $r_{a1}$ | $r_{b1}$ | $r_{c1}$ | $r_{d1}$ |
| | | | $d_2$ | $r_{a2}$ | $r_{b2}$ | $r_{c2}$ | $r_{d2}$ |
| | | | ・・・ | ・・・ | ・・・ | ・・・ | ・・・ |
| | | $h_2$ | $d_1$ | $r_{aa1}$ | $r_{ba1}$ | $r_{ca1}$ | $r_{da1}$ |
| | | | $d_2$ | $r_{aa2}$ | $r_{ba2}$ | $r_{ca2}$ | $r_{da2}$ |
| | | | ・・・ | ・・・ | ・・・ | ・・・ | ・・・ |
| | | ・・・ | ・・・ | ・・・ | ・・・ | ・・・ | ・・・ |
| | INK UNIT 108B | $h_1$ | $d_1$ | $r_{e1}$ | $r_{f1}$ | $r_{g1}$ | $r_{h1}$ |
| | | | $d_2$ | $r_{e2}$ | $r_{f2}$ | $r_{g2}$ | $r_{h2}$ |
| | | | ・・・ | ・・・ | ・・・ | ・・・ | ・・・ |
| | | $h_2$ | $d_1$ | $r_{ea1}$ | $r_{fa1}$ | $r_{ga1}$ | $r_{ha1}$ |
| | | | $d_2$ | $r_{ea2}$ | $r_{fa2}$ | $r_{ga2}$ | $r_{ha2}$ |
| | | | ・・・ | ・・・ | ・・・ | ・・・ | ・・・ |
| | | ・・・ | ・・・ | ・・・ | ・・・ | ・・・ | ・・・ |
| | INK UNIT 108C | $h_1$ | $d_1$ | $r_{i1}$ | $r_{j1}$ | $r_{k1}$ | $r_{l1}$ |
| | | | $d_2$ | $r_{i2}$ | $r_{j2}$ | $r_{k2}$ | $r_{l2}$ |
| | | | ・・・ | ・・・ | ・・・ | ・・・ | ・・・ |
| | | $h_2$ | $d_1$ | $r_{ia1}$ | $r_{ja1}$ | $r_{ka1}$ | $r_{la1}$ |
| | | | $d_2$ | $r_{ia2}$ | $r_{ja2}$ | $r_{ka2}$ | $r_{la2}$ |
| | | | ・・・ | ・・・ | ・・・ | ・・・ | ・・・ |
| | | ・・・ | ・・・ | ・・・ | ・・・ | ・・・ | ・・・ |
| AT TIME OF CLEANING | | — | — | $r_x$ | $r_y$ | $r_z$ | $r_w$ |

INKJET PRINTER, FLOW PATH RESISTANCE ADJUSTMENT METHOD, AND PRINTING METHOD

CROSS-REFERENCE TO RELATED APPLICATIONS

This application is based upon and claims the benefit of priority from the prior Japanese Patent Application Nos. 2022-051907 filed on Mar. 28, 2022 and 2022-052412 filed on Mar. 28, 2022, the entire contents of which are incorporated herein by reference.

BACKGROUND

1. Technical Field

The disclosure relates to an inkjet printer, a flow path resistance adjustment method, and a printing method.

2. Related Art

There is a known inkjet printer that has an inkjet head arranged in such a way as to eject ink in the horizontal direction, and is able to print on a surface orthogonal to the horizontal direction (for example, the lateral side of a cardboard box).

In the above inkjet printer, the nozzles in the nozzle row of the inkjet head are arranged in a direction (vertical direction) orthogonal to the horizontal direction, and thus the height position of each nozzle is different. For this reason, each nozzle has a different water head difference between a tank that is connected to the inkjet head and supplies ink to the inkjet head and a tank that recovers ink from the inkjet head.

This leads to a difference in nozzle pressure in each nozzle. This may result in some nozzles being unable to eject ink stably.

Japanese Patent Laid-Open No. 2018-1687 discloses a technique for printing by specifying a range of nozzles capable of stably ejecting ink when printing is performed by ejecting ink in the horizontal direction.

SUMMARY

With the technique described in Japanese Patent Laid-Open No. 2018-1687, it is difficult to print a wide image in one attempt. That is, in the case of a wide inkjet head for printing a wide image in one attempt, there is a large difference in the height position between the nozzles at the upper end of the nozzle row and the nozzles at the lower end of the nozzle row, and thus there is a large difference in the nozzle pressure according to the water head difference with a tank. For this reason, the range of the nozzles capable of stably ejecting ink becomes narrow with respect to the width of the inkjet head, and thus it may not be possible to print an image of a desired width in one attempt.

The above-described problem occurs not only in the case of printing by ejecting ink in the horizontal direction, but also in the case of printing by ejecting ink in a direction that is not orthogonal to the horizontal direction by using an inkjet head arranged such that the row direction of the nozzles in the nozzle row is a non-horizontal direction.

The disclosure relates to an inkjet printer, a flow path resistance adjustment method, and a printing method that are capable of printing a wide image in one attempt when printing is performed by ejecting ink in a direction that is not orthogonal to the horizontal direction.

An inkjet printer in accordance with some embodiments includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and an ink path connecting the ink tank with the inkjet head. The printing is performed in a state where a parameter related to a flow path resistance of the ink path is set such that a nozzle pressure of each of the nozzles at a time of printing is within a prescribed range enabling ink to be stably ejected and ink flows at a flow rate required for the inkjet head. Note that the parameter related to the flow path resistance may be adjustable by control or may be set in advance (i.e. not adjustable afterward).

A flow path resistance adjustment method in accordance with some embodiments is a method of adjusting a parameter related to a flow path resistance of an ink path in an inkjet printer. The inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and the ink path connecting the ink tank with the inkjet head. The flow path resistance adjustment method includes adjusting the parameter related to the flow path resistance of the ink path such that a nozzle pressure of each of the nozzles at a time of printing is within a prescribed range enabling ink to be stably ejected and ink flows at a flow rate required for the inkjet head. Note that the parameter related to the flow path resistance may be adjustable by control or may be set in advance (i.e. not adjustable afterward).

A printing method in accordance with some embodiments is a printing method in an inkjet printer. The inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and an ink path connecting the ink tank with the inkjet head. The printing method includes performing the printing in a state where a parameter related to a flow path resistance of the ink path is set such that a nozzle pressure of each of the nozzles is within a prescribed range enabling ink to be stably ejected and ink flows at a flow rate required for the inkjet head. Note that the parameter related to the flow path resistance may be adjustable by control or may be set in advance (i.e. not adjustable afterward).

The above configuration makes it possible to print a wide image in one attempt when printing is performed by ejecting ink in a direction that is not orthogonal to the horizontal direction.

BRIEF DESCRIPTION OF DRAWINGS

FIG. 12 is a diagram illustrating a flow path resistance table according to the second embodiment.

DETAILED DESCRIPTION

Figure 1:
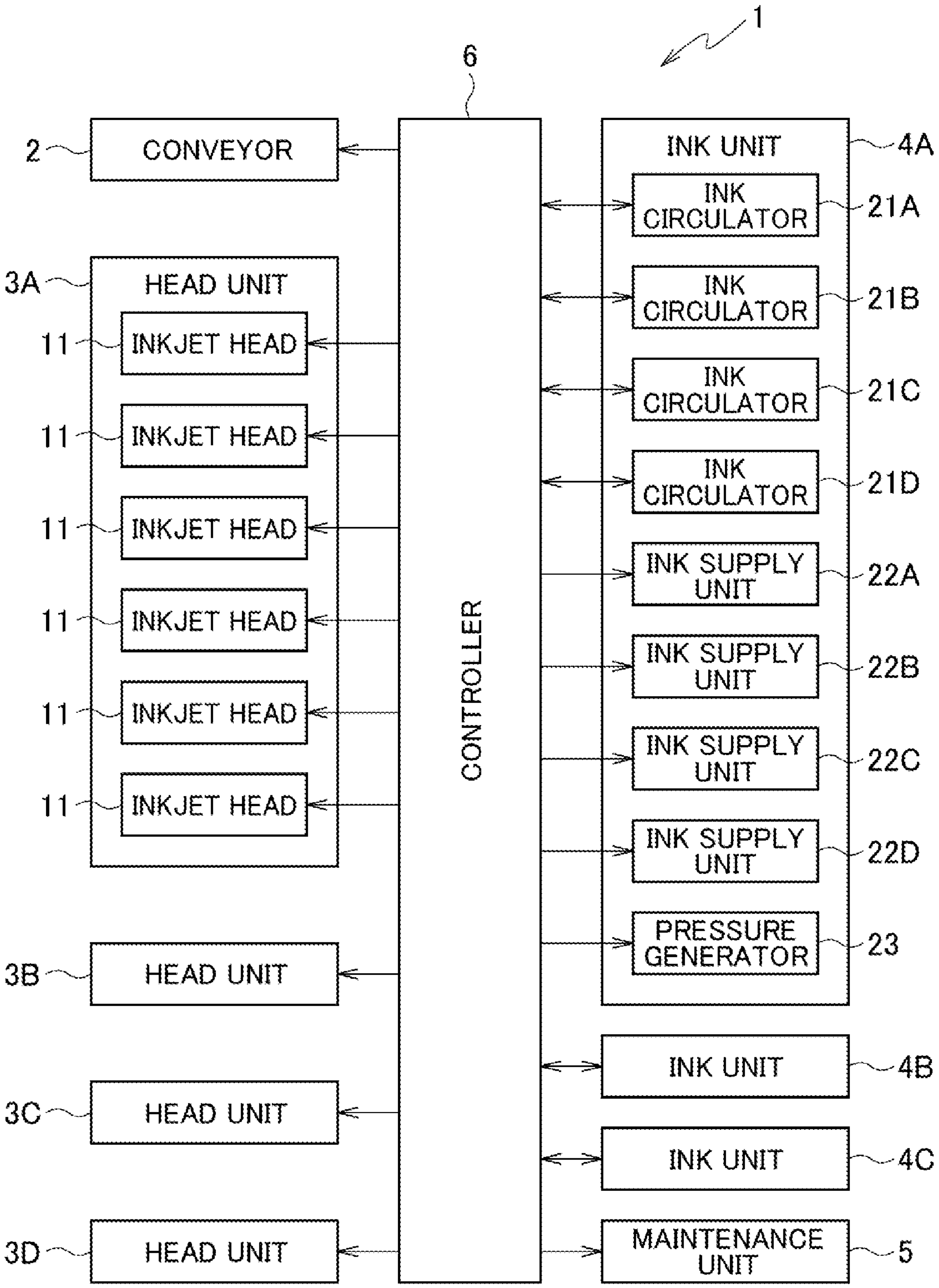
FIG. 1 is a block diagram illustrating a configuration of an inkjet printer according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
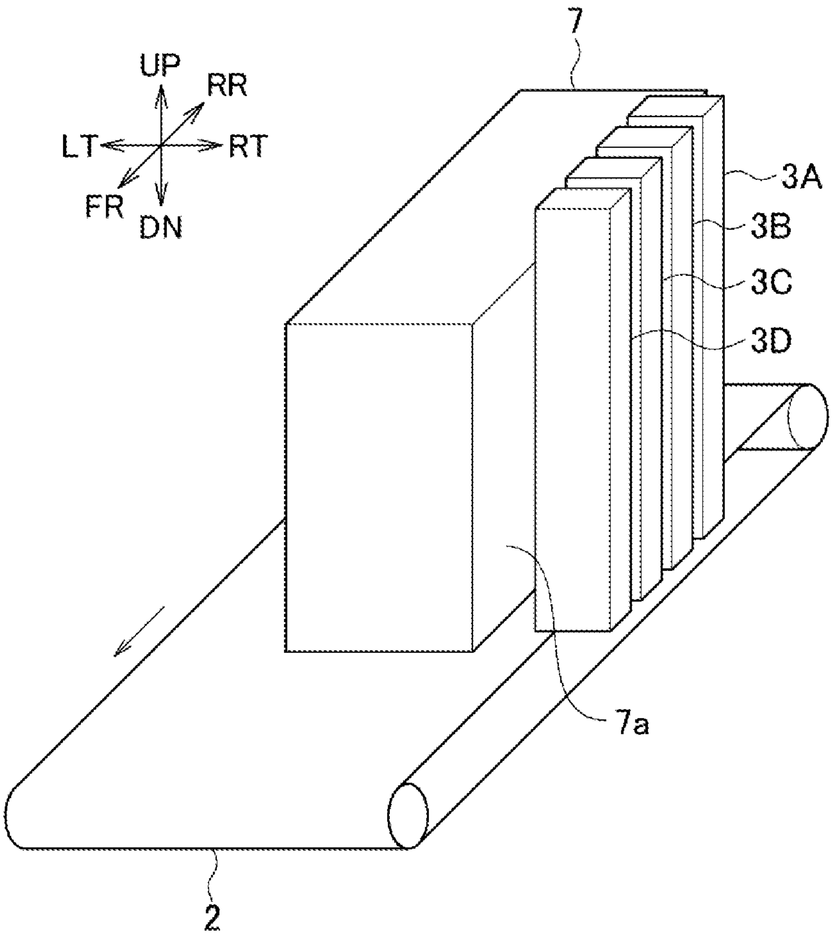
FIG. 2 is a schematic configuration diagram of a conveyor and head units of the inkjet printer illustrated in FIG. 1.
Figure 3:
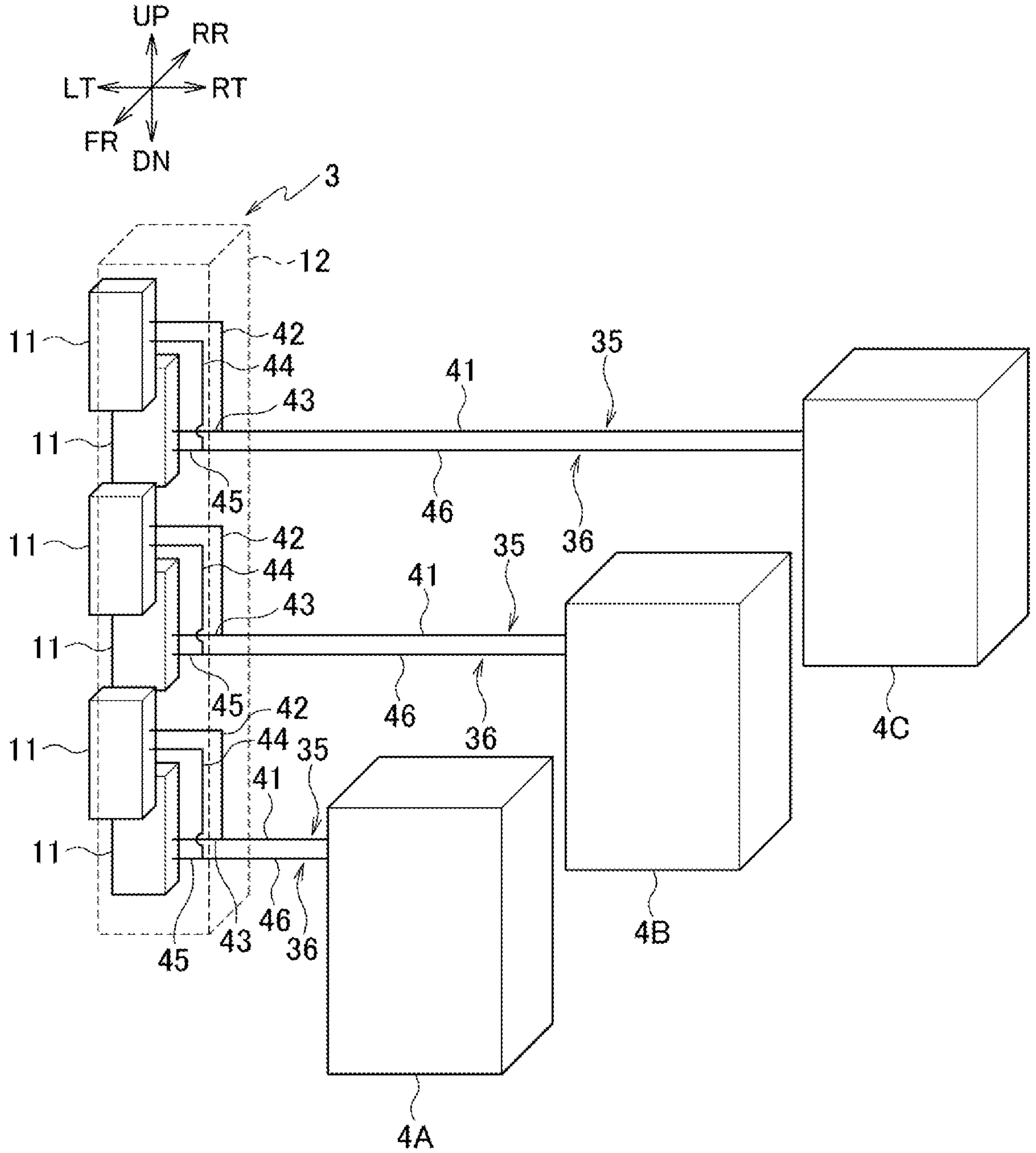
FIG. 3 is a schematic configuration diagram of the head units and ink units of the inkjet printer illustrated in FIG. 1.
Figure 4:
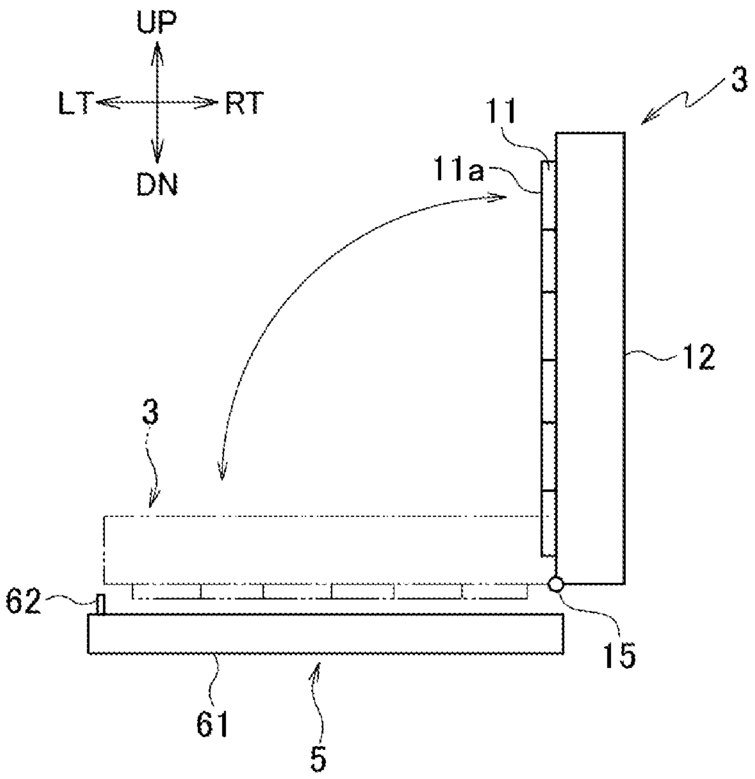
FIG. 4 is a schematic configuration diagram of a maintenance unit of the inkjet printer illustrated in FIG. 1.
Figure 5:
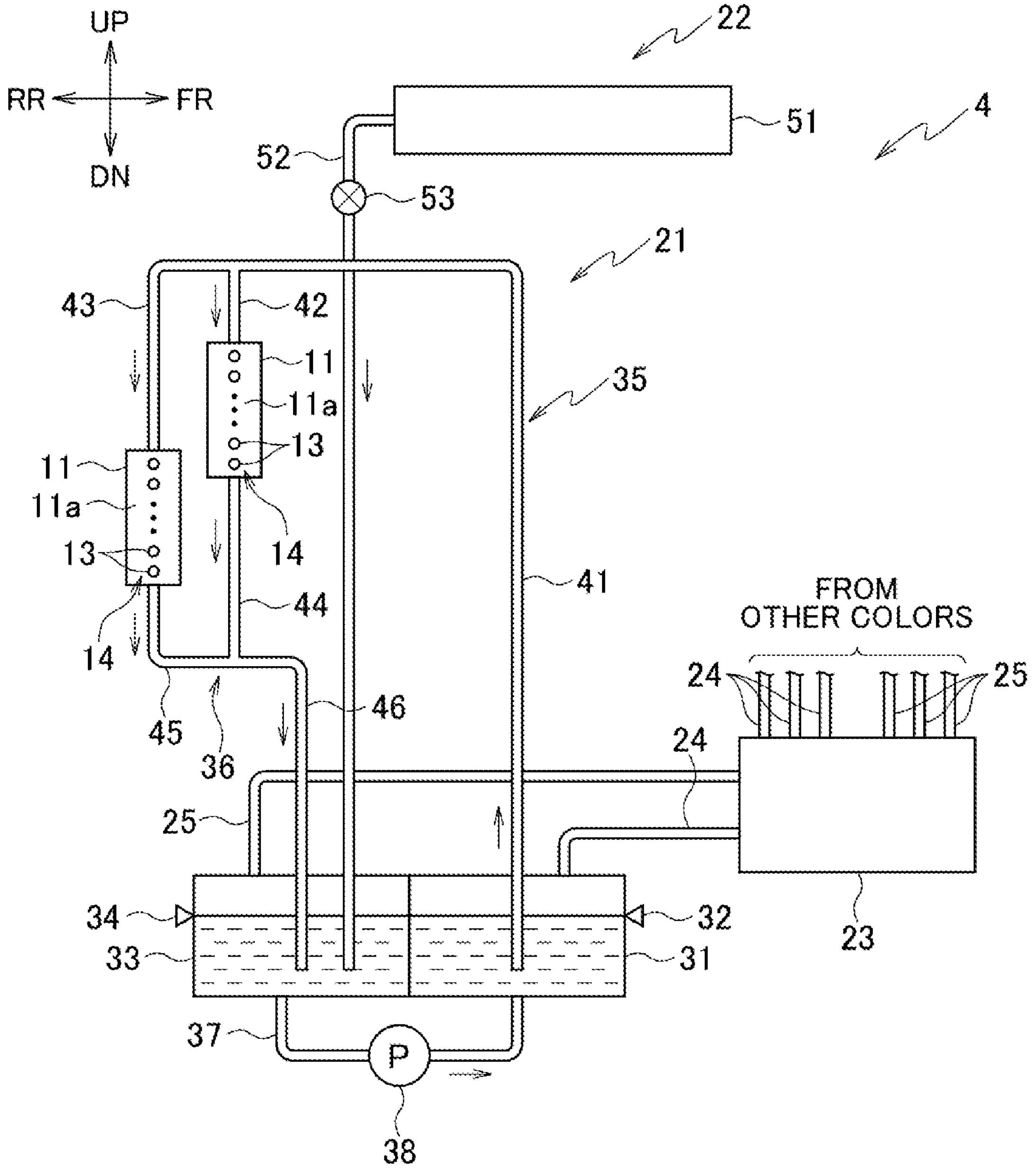
FIG. 5 is a schematic configuration diagram of the ink units of the inkjet printer illustrated in FIG. 1.

A first embodiment of the present invention will be described with reference to FIGS. 1 to 6. FIG. 1 is a block diagram illustrating the configuration of an inkjet printer 1 according to a first embodiment. FIG. 2 is a schematic configuration diagram of a conveyor 2 and head units 3A to 3D of the inkjet printer 1 illustrated in FIG. 1. FIG. 3 is a schematic configuration diagram of the head units 3A to 3D and ink units 4A to 4C of the inkjet printer 1 illustrated in FIG. 1. FIG. 4 is a schematic configuration diagram of a maintenance unit 5 of the inkjet printer 1 illustrated in FIG. 1. FIG. 5 is a schematic configuration diagram of the ink units 4A to 4C of the inkjet printer 1 illustrated in FIG. 1. In FIGS. 2 to 5, the right, left, up, down, front and rear directions are denoted as RT, LT, UP, DN, FR and RR, respectively. The up-down direction is the vertical direction, and the left-right and the front-rear directions are orthogonal to each other and both of the left-right and front-rear directions are orthogonal to the up-down direction and parallel to the horizontal direction.

As illustrated in FIG. 1, the inkjet printer 1 includes the conveyor 2, the head units 3A to 3D, the ink units 4A to 4C, the maintenance unit 5, and a controller 6. Note that the head units 3A to 3D and the like may be referred to in a collective manner with the alphabetical suffixes in the reference numerals being omitted.

The conveyor 2 conveys a printing medium 7 in the conveyance direction parallel to the horizontal direction (in the front direction in FIG. 2). The printing medium 7 has a printed surface 7a on which printing is performed by the head unit 3. The printed surface 7a (vertical surface) is a surface orthogonal to the horizontal direction in a state where the printing medium 7 is placed and conveyed on the conveyor 2. The printing medium 7 is, for example, a cardboard box.

The head units 3A to 3D eject ink onto the printed surface 7a of the printing medium 7 to perform printing. The head units 3A to 3D eject ink of different colors (for example, black, cyan, magenta, and yellow). The head units 3A to 3D have similar configurations except that the color of the ink to be ejected differs. As illustrated in FIG. 2, the head units 3A to 3D are arranged along the conveyance direction of the printing medium 7.

The head unit 3 is rotatable between the printing position indicated by the solid lines and the cleaning position indicated by the two-dot chain lines in FIG. 4. The head unit 3 may be manually rotatable or configured to be rotatable by using a driving force such as a motor. The head unit 3 may be movable between the printing position and the cleaning position.

The printing position is a position of the head unit 3 when printing is performed on the printing medium 7. The printing position is a position where a nozzle surface 11a of an inkjet head 11 described later is orthogonal to the horizontal direction and parallel to the printed surface 7a of the printing medium 7 on the conveyor 2.

The cleaning position is a position of the head unit 3 when performing cleaning of the inkjet head 11. The cleaning position is a position where the nozzle surface 11a of the inkjet head 11 is horizontal.

Unless specifically described, it is assumed that the head unit 3 is arranged in the printing position and the up-down direction of the head unit 3 is the up-down direction in the state where the head unit 3 is arranged in the printing position.

As illustrated in FIG. 3 and FIG. 4, the head unit 3 includes a plurality of inkjet heads 11 and a head holder 12. In the present embodiment, the head unit 3 includes six inkjet heads 11.

In the head unit 3, the six inkjet heads 11 are staggered along the up-down direction. That is, in the head unit 3, the six inkjet heads 11 arranged along the up-down direction are arranged with the respective positions in the front-rear direction staggered alternately.

The inkjet head 11 ejects ink onto the printed surface 7a of the printing medium 7. The inkjet head 11 has a nozzle row 14 (see FIG. 5) in which a plurality of nozzles 13 for ejecting ink are linearly arranged at a predetermined pitch. In the state where the head unit 3 is placed at the printing position, the row direction of the nozzles 13 in the nozzle row 14 is the direction orthogonal to the horizontal direction (the up-down direction).

The nozzles 13 are open at the nozzle surface 11a of the inkjet head 11. The nozzles 13 eject ink in the direction orthogonal to the nozzle surface 11a. That is, the nozzles 13 eject ink in the horizontal direction when printing is performed on the printed surface 7a of the printing medium 7.

The head holder 12 holds the inkjet heads 11. The head holder 12 holds each inkjet head 11 such that the nozzle surfaces 11a of all the inkjet heads 11 are arranged in the same plane. The head holder 12 is provided with a rotating shaft 15 extending in the front-rear direction, which is a direction parallel to the nozzle surface 11*a* and orthogonal to the row direction of the nozzles 13. The head unit 3 is rotatable between the printing position and the cleaning position around the rotating shaft 15. In FIG. 4, the rotating shaft 15 is arranged at the left end of the lower end of the head holder 12 with the head unit 3 in the printing position; however, the present invention is not limited to this configuration. For example, the rotating shaft 15 may be arranged at the right end of the lower end of the head holder 12 with the head unit 3 in the printing position.

The ink units 4A to 4C supply ink to the head units 3A to 3D. The ink unit 4A supplies ink to the inkjet heads 11 that are first and second from the bottom in each of the head units 3A to 3D. The ink unit 4B supplies ink to the inkjet heads 11 that are third and fourth from the bottom in each of the head units 3A to 3D. The ink unit 4C supplies ink to the inkjet heads 11 that are fifth and sixth from the bottom in each of the head units 3A to 3D.

In FIG. 3, only one head unit 3 is illustrated and the other three head units 3 are not illustrated.

The ink units 4 include ink circulators 21A to 21D, ink supply units 22A to 23D, a pressure generator 23, four positive pressure air paths 24 (see FIG. 5), and four negative pressure air paths 25 (see FIG. 5).

The ink circulators 21A to 21D supply ink to the inkjet heads 11 while circulating ink. The ink circulators 21A to 21D are connected to two inkjet heads 11 arranged at different height positions in each of the head units 3A to 3D, and supply ink to the two inkjet heads 11.

Specifically, the ink circulators 21A to 21D of the ink unit 4A supply ink to the inkjet heads 11 that are first and second from the bottom in each of the head units 3A to 3D. The ink circulators 21A to 21D of the ink unit 4B supply ink to the inkjet heads 11 that are third and fourth from the bottom in each of the head units 3A to 3D. The ink circulators 21A to 21D of the ink unit 4C supply ink to the inkjet heads 11 that are fifth and sixth from the bottom in each of the head units 3A to 3D.

As illustrated in FIG. 5, the ink circulator 21 includes: a positive pressure tank 31 (ink tank); a positive pressure tank liquid level sensor 32; a negative pressure tank 33 (ink tank); a negative pressure tank liquid level sensor 34; a positive pressure ink path 35 (ink path); a negative pressure ink path 36 (ink path); a pump liquid delivery path 37; and an ink pump 38.

The positive pressure tank 31 stores ink to be supplied to the inkjet head 11. The positive pressure tank 31 receives a positive pressure for delivering ink to the inkjet head 11, from the pressure generator 23. The positive pressure tank 31 is placed at a lower position than the inkjet head 11 placed at a lower position (the lower inkjet head 11) among two inkjet heads 11 connected to the ink circulator 21 including the positive pressure tank 31.

The positive pressure tank liquid level sensor 32 detects whether or not the liquid level of ink in the positive pressure tank 31 has reached the reference height. The positive pressure tank liquid level sensor 32 outputs a signal indicating "on" when the liquid level in the positive pressure tank 31 is equal to or greater than the reference height, and outputs a signal indicating "off" when it is less than the reference height.

The negative pressure tank 33 receives and stores ink that has not been consumed by the inkjet head 11. The negative pressure tank 33 stores ink supplied from the ink supply unit 22. The negative pressure tank 33 receives a negative pressure for recovering ink from the inkjet head 11, from the pressure generator 23. The negative pressure tank 33 is configured of a tank having the same shape as the positive pressure tank 31 and is placed at the same height as the positive pressure tank 31.

The negative pressure tank liquid level sensor 34 detects whether or not the liquid level of ink in the negative pressure tank 33 has reached the reference height. The reference height in the negative pressure tank 33 is the same as the reference height in the positive pressure tank 31. The negative pressure tank liquid level sensor 34 outputs a signal indicating "on" when the liquid level in the negative pressure tank 33 is equal to or greater than the reference height, and outputs a signal indicating "off" when it is less than the reference height.

The positive pressure ink path 35 connects the positive pressure tank 31 with two inkjet heads 11. Ink supplied from the positive pressure tank 31 to two inkjet heads 11 flows through the positive pressure ink path 35. The positive pressure ink path 35 includes a positive pressure common path 41, a positive pressure upper head path 42 (positive pressure branch path), and a positive pressure lower head path 43 (positive pressure branch path).

The positive pressure common path 41 is a common path for ink flowing from the positive pressure tank 31 to the upper inkjet head 11 and ink flowing from the positive pressure tank 31 to the lower inkjet head 11. The upstream end of the positive pressure common path 41 in the circulation direction of ink in the ink circulator 21 is connected to the positive pressure tank 31, and the downstream end thereof is connected to the upstream end of the positive pressure upper head path 42 and the upstream end of the positive pressure lower head path 43.

The circulation direction of ink in the ink circulator 21 is a direction that heads toward the inkjet head 11 from the positive pressure tank 31 along the positive pressure ink path 35 and returns from the inkjet head 11 to the positive pressure tank 31 via the negative pressure tank 33.

The positive pressure upper head path 42 is a path through which ink flows from the positive pressure common path 41 to the upper inkjet head 11. The upstream end of the positive pressure upper head path 42 in the circulation direction of ink is connected to the downstream end of the positive pressure common path 41 and the upstream end of the positive pressure lower head path 43, and the downstream end thereof is connected to the upper inkjet head 11.

The positive pressure lower head path 43 is a path through which ink flows from the positive pressure common path 41 to the lower inkjet head 11. The upstream end of the positive pressure lower head path 43 in the circulation direction of ink is connected to the downstream end of the positive pressure common path 41 and the upstream end of the positive pressure upper head path 42, and the downstream end thereof is connected to the lower inkjet head 11.

The negative pressure ink path 36 connects two inkjet heads 11 with the negative pressure tank 33. Ink that has not been consumed in two inkjet heads 11 and has been recovered into the negative pressure tank 33 flows through the negative pressure ink path 36. The negative pressure ink path 36 includes a negative pressure upper head path 44 (negative pressure branch path), a negative pressure lower head path 45 (negative pressure branch path), and a negative pressure common path 46.

The negative pressure upper head path 44 is a path through which ink flows from the upper inkjet head 11 to the negative pressure common path 46. The upstream end of the negative pressure upper head path 44 in the circulation direction of ink is connected to the upper inkjet head 11, and the downstream end thereof is connected to the upstream end of the negative pressure common path 46 and the downstream end of the negative pressure lower head path 45.

The negative pressure lower head path 45 is a path through which ink flows from the lower inkjet head 11 to the negative pressure common path 46. The upstream end of the negative pressure lower head path 45 in the circulation direction of ink is connected to the lower inkjet head 11, and the downstream end thereof is connected to the upstream end of the negative pressure common path 46 and the downstream end of the negative pressure upper head path 44.

The negative pressure common path 46 is a common path for ink flowing from the upper inkjet head 11 to the negative pressure tank 33 and ink flowing from the lower inkjet head 11 to the negative pressure tank 33. The upstream end of the negative pressure common path 46 in the circulation direction of ink is connected to the downstream end of the negative pressure upper head path 44 and the downstream end of the negative pressure lower head path 45, and the downstream end thereof is connected to the negative pressure tank 33.

In the positive pressure upper head path 42, the positive pressure lower head path 43, the negative pressure upper head path 44, and the negative pressure lower head path 45 described above, the respective flow path resistances are set (adjusted) such that the nozzle pressure of each nozzle 13 in the nozzle row 14 in two inkjet heads 11 is within a stable ejection range (prescribed range), and such that ink of the same flow rate flows at the flow rate required for the two inkjet heads 11. The stable ejection range of the nozzle pressure is a range of the nozzle pressure at which the nozzles 13 can stably eject ink. A description will be given later regarding the method of setting a flow path resistance of the positive pressure upper head path 42, the positive pressure lower head path 43, the negative pressure upper head path 44, and the negative pressure lower head path 45.

The pump liquid delivery path 37 is a path through which ink delivered by the ink pump 38 flows from the negative pressure tank 33 to the positive pressure tank 31. The upstream end of the pump liquid delivery path 37 in the circulation direction of ink is connected to the negative pressure tank 33, and the downstream end thereof is connected to the positive pressure tank 31.

The ink pump 38 delivers ink from the negative pressure tank 33 to the positive pressure tank 31. The ink pump 38 is provided in the middle of the pump liquid delivery path 37.

The ink supply units 22A to 22D supply ink to the ink circulators 21A to 21D, respectively. The ink supply unit 22 includes an ink cartridge 51, an ink supply path 52, and an ink supply valve 53.

The ink cartridge 51 contains ink used for printing performed by the inkjet head 11. The ink in the ink cartridge 51 is supplied to the negative pressure tank 33 of the ink circulator 21 via the ink supply path 52.

The ink supply path 52 connects the ink cartridge 51 with the negative pressure tank 33. In the ink supply path 52, ink flows from the ink cartridge 51 toward the negative pressure tank 33.

The ink supply valve 53 opens and closes the flow path of ink in the ink supply path 52. The ink supply valve 53 opens when ink is supplied to the negative pressure tank 33.

The pressure generator 23 generates a pressure for ink circulation in the positive pressure tank 31 and the negative pressure tank 33 of the ink circulator 21. Specifically, the pressure generator 23 draws air from the negative pressure tank 33 through the negative pressure air path 25 and sends air to the positive pressure tank 31 through the positive pressure air path 24, thereby applying a positive pressure to the positive pressure tank 31 and applying a negative pressure to the negative pressure tank 33. The pressure generator 23 is used for each of the ink circulators 21A to 21D.

The positive pressure air path 24 connects the pressure generator 23 with an air layer on the liquid surface of ink of the positive pressure tank 31. The positive pressure air path 24 is provided corresponding to each of the ink circulators 21A to 21D.

The negative pressure air path 25 connects the pressure generator 23 with an air layer on the liquid surface of ink of the negative pressure tank 33. The negative pressure air path 25 is provided corresponding to each of the ink circulators 21A to 21D.

The maintenance unit 5 performs cleaning of the nozzle surface 11*a* of each inkjet head 11 of the head units 3A to 3D. The maintenance unit 5 is movable between a deployed position where the maintenance unit 5 is placed when performing cleaning of the inkjet head 11, and a retracted position to which the maintenance unit 5 is retracted from the deployed position. The deployed position is the position of the maintenance unit 5 illustrated in FIG. 4, which is a position immediately below the head unit 3 arranged in the cleaning position. The maintenance unit 5 in the retracted position is not illustrated. The maintenance unit 5 includes an ink receiving unit 61 and a wiper 62 as illustrated in FIG. 4.

The ink receiving unit 61 receives ink or the like to be removed from the nozzle surface 11*a* by wiping using the wiper 62 at the time of cleaning of the inkjet head 11.

The wiper 62 wipes the nozzle surface 11*a* of the inkjet head 11 to remove ink or the like on the nozzle surface 11*a*. The maintenance unit 5 is provided with a wiper 62 for wiping the front three inkjet heads 11 and a wiper 62 for wiping the rear three inkjet heads 11, out of six inkjet heads 11 arranged in a staggered manner for each of the head units 3A to 3D. That is, eight wipers 62 are provided in total in the maintenance unit 5.

The controller 6 controls the operation of each unit of the inkjet printer 1. The controller 6 is configured of a CPU, RAM, ROM, hard disk, or the like.

Next, a description will be given regarding the method of setting a flow path resistance of the positive pressure upper head path 42, the positive pressure lower head path 43, the negative pressure upper head path 44, and the negative pressure lower head path 45 of the ink circulator 21 described above.

Figure 6:
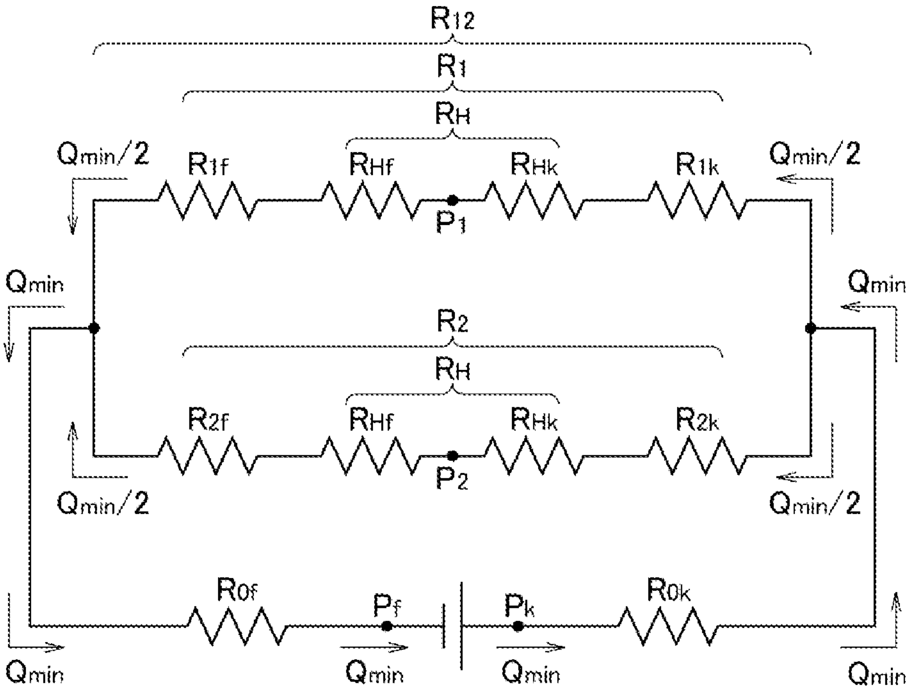
FIG. 6 is a fluid circuit model diagram of an ink circulator of the inkjet printer illustrated in FIG. 1 and two inkjet heads connected to the ink circulator.

FIG. 6 is a fluid circuit model diagram of two inkjet heads 11 connected to the ink circulator 21 and the ink circulator 21.

In FIG. 6, $P_k$ and $P_f$ are the set pressures of the positive pressure tank 31 and the negative pressure tank 33, respectively, at the time of ink circulation (printing). At the time of ink circulation, each pressure of the positive pressure tank 31 and the negative pressure tank 33 is adjusted to $P_k$ and $P_f$, respectively, by using the pressure generator 23.

$P_1$ is an average nozzle pressure of the upper inkjet head 11, and is a nozzle pressure of the center nozzle 13 in the nozzle row 14 of the upper inkjet head 11. $P_2$ is an average nozzle pressure of the lower inkjet head 11, and is a nozzle pressure of the center nozzle 13 in the nozzle row 14 of the lower inkjet head 11. Since a water head difference between the nozzles 13 in the upper inkjet head 11 is generated and a water head difference between the nozzles 13 in the lower inkjet head 11 is generated, $P_1$ which is the average nozzle pressure of the nozzles 13 in the upper inkjet head 11 and $P_2$ which is the average nozzle pressure of the nozzles 13 in the lower inkjet head 11 are used.

$Q_{min}$ is an ink circulation flow rate required at the time of ink circulation (printing).

$R_{0k}$ is a flow path resistance of the positive pressure common path 41. $R_{0k}$ is a fixed value. $R_{1k}$ is a flow path resistance of the positive pressure upper head path 42. $R_{2k}$ is a flow path resistance of the positive pressure lower head path 43.

$R_{0f}$ is a flow path resistance of the negative pressure common path 46. $R_{0f}$ is a fixed value. Rif is a flow path resistance of the negative pressure upper head path 44. $R_{2f}$ is a flow path resistance of the negative pressure lower head path 45.

$R_{Hk}$ is a flow path resistance of the path from an ink inlet port to the nozzles 13 in the inkjet head 11. $R_{Hf}$ is a flow path resistance of the path from the nozzles 13 to an ink outlet port in the inkjet head 11. $R_{Hk}$ and $R_{Hf}$ are fixed values. $R_H$ is a flow path resistance in the inkjet head 11. $R_H$ is expressed by the following equation (1):

$$R_H = R_{Hk} + R_{Hf} \tag{1}$$

$R_1$ is a flow path resistance of the flow path including the positive pressure upper head path 42, the upper inkjet head 11, and the negative pressure upper head path 44. $R_1$ is expressed by the following equation (2):

$$R_1 = R_{1k} + R_H + R_{1f} \tag{2}$$

$R_2$ is a flow path resistance of the flow path including the positive pressure lower head path 43, the lower inkjet head 11, and the negative pressure lower head path 45. $R_2$ is expressed by the following equation (3):

$$R_2 = R_{2k} + R_H + R_{2f} \tag{3}$$

$R_{12}$ is a flow path resistance between the downstream end of the positive pressure common path 41 and the upstream end of the negative pressure common path 46. $R_{12}$ is expressed by the following equation (4):

$$R_{12} = R_1 \times R_2 / (R_1 + R_2) \tag{4}$$

When a flow path resistance of the entire path from the positive pressure tank 31 to the negative pressure tank 33 via the inkjet head 11 is assumed to be R, R is expressed by the following equation (5):

$$R = R_{0k} + R_{12} + R_{0f} \tag{5}$$

As described above, the flow path resistance $R_{1k}$ of the positive pressure upper head path 42, the flow path resistance $R_{2k}$ of the positive pressure lower head path 43, the flow path resistance $R_{1f}$ of the negative pressure upper head path 44, and the flow path resistance $R_{2f}$ of the negative pressure lower head path 45 are set such that the nozzle pressure of each nozzle 13 in the nozzle row 14 in two inkjet heads 11 is within a stable ejection range, and such that ink of the same flow rate flows at the flow rate required for the two inkjet heads 11.

Specifically, $R_{1k}$, $R_{2k}$, $R_{1f}$, and $R_{2f}$ are set such that the following equations (6) to (8) hold.

$$P_1 = P_2 = P_{typ} \tag{6}$$

$$R_1 = R_2 \tag{7}$$

$$R = (P_k - P_f) / Q_{min} \tag{8}$$

Equation (6) described above shows the conditions for ensuring that a nozzle pressure of each nozzle 13 in the nozzle row 14 in two inkjet heads 11 is within a stable ejection range. The reason for the condition that Equation (6) is to hold is as follows:

In the ink circulator 21 and two inkjet heads 11 connected to the ink circulator 21, when the following equation (9) holds, a nozzle pressure of each nozzle 13 in the nozzle row 14 in two inkjet heads 11 is within a stable ejection range.

$$\Delta P \geq P_{Hh} + |P_1 - P_2| + P\sigma \tag{9}$$

Here, $\Delta P$ is the difference ($P_{max} - P_{min}$) between the upper limit of the stable ejection range (maximum nozzle pressure $P_{max}$ at which stable ejection can be performed) and the lower limit of the stable ejection range (minimum nozzle pressure $P_{min}$ at which stable ejection can be performed).

$P_{Hh}$ is a water head difference in the inkjet head 11. Specifically, $P_{Hh}$ is the difference ($P_{nl} - P_{nu}$) between the nozzle pressure $P_{nl}$ of the nozzles 13 at the lower end in the nozzle row 14 of the inkjet head 11 and the nozzle pressure $P_{nu}$ of the nozzles 13 at the upper end thereof.

$P\sigma$ is the variation (dispersion) of the nozzle pressure in two inkjet heads 11. $P\sigma$ is determined by the performance of the pressure generator 23, the variation of each component, or the like.

As can be seen from Equation (9), Equation (9) is likely to hold as the value of $|P_1 - P_2|$ decreases. For this reason, in the present embodiment, $P_1 = P_2$ is obtained as can be seen in Equation (6). This eliminates the pressure difference due to the water head difference between the upper inkjet head 11 and the lower inkjet head 11, thereby making it easier for Equation (9) to hold. In the present embodiment, the ink circulator 21 and the inkjet head 11 are configured such that $P_{Hh}$ and $P\sigma$ become values for which Equation (9) holds when $P_1 = P_2$ is obtained.

$P_{typ}$ in Equation (6) is a value of the nozzle pressure to be set in the inkjet head 11 (target value). $P_{typ}$ is set to a value between $P_{max}$ and $P_{min}$.

Equation (7) described above shows the conditions for allowing ink of the same flow rate to flow through two inkjet heads 11. Equation (8) described above shows the conditions for ensuring a flow rate of ink required for printing performed by two inkjet heads 11. The reason for the condition that Equations (7) and (8) are to hold is to cause ink of the same flow rate to flow at the flow rate required for two inkjet heads 11.

$P_1$ is expressed by the following equation (10) when calculated using the positive pressure tank 31.

(Math. 1)

$$P_1 = P_k + P_{1h} - (P_k - P_f) \times \left\{ \frac{R_{0k}}{R} + \frac{R_{12} \times (R_{1k} + R_{Hk})}{R \times R_1} \right\} \tag{10}$$

$P_{1h}$ is a water head pressure of the upper inkjet head 11.

$P_1$ is expressed by the following equation (11) when calculated using the negative pressure tank 33.

(Math. 2)

$$P_1 = P_f + P_{1h} + (P_k - P_f) \times \left\{ \frac{R_{0f}}{R} + \frac{R_{12} \times (R_{1f} + R_{Hf})}{R \times R_1} \right\} \tag{11}$$

$P_2$ is expressed by the following equation (12) when calculated using the positive pressure tank 31.

(Math. 3)

$$P_2 = P_k + P_{2h} - (P_k - P_f) \times \left\{ \frac{R_{0k}}{R} + \frac{R_{12} \times (R_{2k} + R_{Hk})}{R \times R_2} \right\} \quad (12)$$

$P_{2h}$ is a water head pressure of the lower inkjet head 11.

$P_2$ is expressed by the following equation (13) when calculated using the negative pressure tank 33.

(Math. 4)

$$P_2 = P_f + P_{2h} + (P_k - P_f) \times \left\{ \frac{R_{0f}}{R} + \frac{R_{12} \times (R_{2f} + R_{Hf})}{R \times R_2} \right\} \quad (13)$$

From Equations (1) to (13), the following equations (14) to (17) are obtained.

(Math. 5)

$$R_{1k} = 2 \times \left( \frac{P_k + P_{1h} - P_{typ}}{Q_{min}} - R_{0k} \right) - R_{Hk} \quad (14)$$

$$R_{2k} = 2 \times \left( \frac{P_k + P_{2h} - P_{typ}}{Q_{min}} - R_{0k} \right) - R_{Hk} \quad (15)$$

$$R_{1f} = -2 \times \left( \frac{P_f + P_{1h} - P_{typ}}{Q_{min}} - R_{0f} \right) - R_{Hf} \quad (16)$$

$$R_{2f} = -2 \times \left( \frac{P_f + P_{2h} - P_{typ}}{Q_{min}} - R_{0f} \right) - R_{Hf} \quad (17)$$

The flow path resistance $R_{1k}$ of the positive pressure upper head path 42, the flow path resistance $R_{2k}$ of the positive pressure lower head path 43, the flow path resistance $R_{1f}$ of the negative pressure upper head path 44, and the flow path resistance $R_{2f}$ of the negative pressure lower head path 45 are obtained from Equations (14) to (17), respectively.

Specifically, a parameter related to a flow path resistance at the relevant part is set such that the flow path resistances $R_{1k}$, $R_{2k}$, $R_{1f}$, and $R_{2f}$ obtained in Equations (14) to (17) are obtained. A parameter related to a flow path resistance includes the length of a flow path, the diameter of a flow path, the shape of a flow path, and an ink viscosity. At least one of these parameters is adjusted, thereby setting the flow path resistance to the flow path resistance $R_{1k}$, $R_{2k}$, $R_{1f}$, or $R_{2f}$. For example, by adjusting at least one of the length of a flow path, the diameter of a flow path, and the shape of a flow path in the positive pressure upper head path 42, the flow path resistance of the positive pressure upper head path 42 can be adjusted to $R_{1k}$ obtained by Equation (14). The same is applied for the flow path resistances $R_{2k}$, $R_{1f}$, and $R_{2f}$. For example, the inkjet printer 1 includes the positive pressure upper head path 42, the positive pressure lower head path 43, the negative pressure upper head path 44, and the negative pressure lower head path 45 manufactured by adjusting (setting in advance) the parameters related to the flow path resistances as described above.

By setting the flow path resistances $R_{1k}$, $R_{2k}$, $R_{1f}$, and $R_{2f}$ as described above, the flow path resistance $R_{2k}$ of the positive pressure lower head path 43 is greater than the flow path resistance $R_{1k}$ of the positive pressure upper head path 42 at the upstream side of the inkjet head 11. The flow path resistance $R_{2f}$ of the negative pressure lower head path 45 is smaller than the flow path resistance $R_{1f}$ of the negative pressure upper head path 44 at the downstream side of the inkjet head 11. Thereafter, the pressure difference caused by the water head difference between the upper inkjet head 11 and the lower inkjet head 11 is canceled out.

Next, the operation of the inkjet printer 1 will be described.

When a print job is input, the controller 6 starts ink circulation in the ink circulators 21A to 21D of the ink units 4A to 4C. Specifically, the controller 6 controls the pressure generator 23 of the ink units 4A to 4C to generate the set pressures $P_k$ and $P_f$ for ink circulation in the positive pressure tank 31 and the negative pressure tank 33, respectively. This starts ink circulation in the ink circulators 21A to 21D, and ink flows from the positive pressure tank 31 to the negative pressure tank 33 via the inkjet head 11.

When the ink circulation starts, the controller 6 starts executing a print job. Specifically, the conveyor 2 conveys the printing medium 7 and the controller 6 performs control to print an image on the printing medium 7 by ejecting ink from each inkjet head 11 of the head units 3A to 3D.

While executing the print job, ink is supplied from the positive pressure tank 31 to the inkjet head 11, and ink that has not been consumed in the inkjet head 11 is recovered into the negative pressure tank 33. When the positive pressure tank liquid level sensor 32 is turned off and the negative pressure tank liquid level sensor 34 is turned on, the controller 6 drives the ink pump 38. Thus, ink is delivered from the negative pressure tank 33 to the positive pressure tank 31. When the positive pressure tank liquid level sensor 32 is turned on, the controller 6 stops the ink pump 38. In this way, ink is circulated to perform printing.

When the pressure tank liquid level sensor 32 and the negative pressure tank liquid level sensor 34 are both turned off, the controller 6 opens the ink supply valve 53. Thus, ink is supplied from the ink cartridge 51 to the negative pressure tank 33. When the negative pressure tank liquid level sensor 34 is turned on, the controller 6 closes the ink supply valve 53.

When printing based on the print job is finished, the controller 6 controls the pressure generator 23 to finish the ink circulation in the ink circulators 21A to 21D.

Next, the operation for cleaning the nozzle surface 11*a* of the inkjet head 11 in the inkjet printer 1 will be described.

When the head units 3A to 3D are placed in the cleaning position, the controller 6 places the maintenance unit 5 in the deployed position.

Then, the controller 6 controls the pressure generators 23 of the ink units 4A to 4C to apply a positive pressure for cleaning to the positive pressure tank 31 of the ink circulators 21A to 21D. This purges ink from the nozzles 13 in the inkjet head 11. At least part of the ink ejected from the nozzle 13 by purging adheres to the nozzle surface 11*a*.

When the head unit 3 is placed in the cleaning position, unlike when it is placed in the printing position, there is no head difference between the nozzles 13 because the row direction of the nozzles 13 in the nozzle row 14 is horizontal and each of the nozzles 13 is positioned at the same height position. In contrast, since the respective flow path resistances $R_{1k}$, $R_{2k}$, $R_{1f}$, and $R_{2f}$ of the positive pressure upper head path 42, the positive pressure lower head path 43, the negative pressure upper head path 44, and the negative pressure lower head path 45 are adjusted as described above, the amount of ink ejected at the time of purging differs between the upper inkjet head 11 and the lower inkjet head 11; however, it is possible to perform purging.

After purging, the controller 6 controls the maintenance unit 5 to wipe the nozzle surface 11*a* of the inkjet head 11 with the wiper 62, thereby removing dust or the like on the nozzle surface 11*a* together with ink adhering to the nozzle surface 11*a*. As a result, cleaning of the nozzle surface 11*a* of the inkjet head 11 is finished.

As described above, according to the inkjet printer 1, in the ink circulator 21, the parameter related to the flow path resistance of the positive pressure upper head path 42, the positive pressure lower head path 43, the negative pressure upper head path 44, and the negative pressure lower head path 45 is set such that the nozzle pressure of each nozzle 13 in the nozzle row 14 in two inkjet heads 11 connected to the ink circulators 21 is within a stable ejection range, and such that ink of the same flow rate flows at the flow rate required for the two inkjet heads 11.

This makes it possible to suppress the range of the nozzles 13 capable of stably ejecting ink from narrowing even if there is a water head difference between the nozzles 13, and to equally secure the flow rate of ink required for printing, for the two inkjet heads 11 by using the common ink circulator 21. Thus, the inkjet printer 1 of the present embodiment makes it possible to print a wide image in one attempt when printing is performed by ejecting ink in the horizontal direction and to simplify the configuration and control of the inkjet printer 1. The head units 3A to 3D which eject ink of different colors are arranged along the conveyance direction of the printing medium 7. Thus, it is possible to perform printing in the lateral direction which is printing onto the lateral side of the printing medium 7 (for example, a cubic object such as a cardboard box), in full color and with a wide image.

In the inkjet printer 1, printing is performed with the head unit 3 placed in the printing position, and cleaning of the nozzle surface 11*a* of the inkjet head 11 is performed with the head unit 3 placed in the cleaning position. That is, in the inkjet printer 1, the inkjet head 11 performs printing in a state where the row direction of the nozzles 13 in the nozzle row 14 is the up-down direction, and performs cleaning of the nozzle surface 11*a* in a state where the row direction of the nozzles 13 is the horizontal direction. Thus, the inkjet printer 1 of the present embodiment makes it possible to print a wide image in one attempt, and to perform cleaning of the nozzle surface 11*a* by rotating the inkjet head 11 for purging.

In the above embodiment, $P_1=P_2$ is used as the condition for the setting of the flow path resistances $R_{1k}$, $R_{2k}$, $R_{1f}$, and $R_{2f}$; however, the present invention is not limited to $P_1=P_2$ as long as a nozzle pressure of each nozzle 13 in each inkjet head 11 is within a stable ejection range.

The pressure of the positive pressure tank 31 and the negative tank 33 may be used as a parameter related to a flow path resistance.

In the above embodiment, a description has been given regarding the configuration in which ink is supplied to two inkjet heads 11 by one ink circulator 21; however, ink may be supplied to one inkjet head by one ink circulator. In this case, the parameter related to the flow path resistance of the positive pressure ink path connecting the pressure tank with the inkjet head and the parameter related to the flow path resistance of the negative pressure ink path connecting the inkjet head with the negative pressure tank may be set such that the nozzle pressure of each nozzle is within a stable ejection range, and such that ink flows at a flow rate required for the inkjet head. Even in this case, it is possible to suppress the range of the nozzles 13 capable of stably ejecting ink from narrowing even if there is a water head difference between the nozzles 13 in the inkjet head 11, and to equally secure the flow rate of ink required for printing. As a result, it is possible to print a wide image in one attempt when printing is performed by ejecting ink in the horizontal direction.

Ink may be supplied to three or more inkjet heads by one ink circulator. Even in this case, the parameter related to the respective flow path resistances of a plurality of positive pressure branch paths and a plurality of negative pressure branch paths connected to the respective inkjet heads may be set such that the nozzle pressure of each nozzle in the nozzle rows in the respective inkjet heads is within a stable ejection range, and such that ink of the same flow rate flows at the flow rate required for each inkjet head.

The parameter related to the flow path resistance of the ink path may be adjusted or the flow path resistance itself may be adjusted such that the nozzle pressure of each nozzle in the nozzle rows of the inkjet heads is within a stable ejection range, and such that ink of the same flow rate flows at the flow rate required for each inkjet head.

In the above-described embodiment, a description has been given regarding the inkjet printer 1, in which printing is performed by ejecting ink in the horizontal direction by using the inkjet head 11 arranged such that the row direction of the nozzles 13 in the nozzle row 14 is a direction orthogonal to the horizontal direction. However, the present invention is not limited to this configuration. The present invention is applicable to an inkjet printer that performs printing by ejecting ink in a direction that is not orthogonal to the horizontal direction by using an inkjet head arranged such that the row direction of the nozzles in the nozzle row is the non-horizontal direction and the height position of each nozzle is different.

Embodiments of the disclosure include, for example, the following configuration.

An inkjet printer in accordance with some embodiments of the present invention includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and an ink path connecting the ink tank with the inkjet head. The printing is performed in a state where a parameter related to a flow path resistance of the ink path is set such that a nozzle pressure of each of the nozzles at a time of printing is within a prescribed range enabling ink to be stably ejected and ink flows at a flow rate required for the inkjet head.

The parameter related to the flow path resistance of the ink path may be prescribed such that the nozzle pressure of each of the nozzles at a time of the printing is within the prescribed range enabling ink to be stably ejected and ink flows at the flow rate required for the inkjet head.

The ink tank may include: a positive pressure tank configured to store ink supplied to the inkjet head and to receive a positive pressure for delivering ink to the inkjet head; and a negative pressure tank configured to receive ink that has not been consumed in the inkjet head and to receive a negative pressure for recovering ink from the inkjet head. The ink path may include: a positive pressure ink path connecting the positive pressure tank with the inkjet head; and a negative pressure ink path connecting the inkjet head with the positive pressure tank. A parameter related to a flow path resistance of the positive pressure ink path and a parameter related to a flow path resistance of the negative pressure ink path may be prescribed such that that the nozzle pressure of each of the nozzles is within the prescribed range and ink flows at the flow rate required for the inkjet head.

The inkjet head may include inkjet heads arranged at different height positions, respectively. The positive pressure ink path may include positive pressure branch paths connected to the inkjet heads, respectively. The negative pressure ink path may include negative pressure branch paths connected to the inkjet heads, respectively. A parameter related to respective flow path resistances of the positive pressure branch paths and the negative pressure branch paths may be prescribed such that the nozzle pressure of each of the nozzles in the nozzle row in each of the inkjet heads is within the prescribed range and ink of a same flow rate flows at a flow rate required for each of the inkjet heads.

The inkjet head may: be rotatable around an axis extending in a direction parallel to a nozzle surface at which the nozzles are open and orthogonal to the row direction; perform printing in a state where the row direction is a non-horizontal direction; and perform purging for cleaning the nozzle surface in a state where the row direction is a horizontal direction.

The inkjet head may include: a first inkjet head configured to eject ink of a first color onto a printing medium being conveyed in a conveyance direction parallel to a horizontal direction; and a second inkjet head configured to eject ink of a second color different from the first color onto the printing medium being conveyed in the conveyance direction. The inkjet printer may further include: a first head unit including the first inkjet head; and a second head unit including the second inkjet head and arranged at a downstream of the first head unit in the conveyance direction.

The inkjet head may include: a first inkjet head; and a second inkjet head arranged at a position higher than a position of the first inkjet head. The printing may be performed in a state where the parameter related to the flow path resistance of the ink path is set such that an average nozzle pressure of the nozzles of the first inkjet head and an average nozzle pressure of the nozzles of the second inkjet head are the same.

A flow path resistance adjustment method in accordance with some embodiments of the present invention is a method of adjusting a parameter related to a flow path resistance of an ink path in an inkjet printer. The inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and the ink path connecting the ink tank with the inkjet head. The flow path resistance adjustment method includes adjusting the parameter related to the flow path resistance of the ink path such that a nozzle pressure of each of the nozzles at a time of printing is within a prescribed range enabling ink to be stably ejected and ink flows at a flow rate required for the inkjet head.

The flow path resistance adjustment method above may include adjusting in advance the parameter related to the flow path resistance of the ink path such that the nozzle pressure of each of the nozzles at the time of printing is within the prescribed range enabling ink to be stably ejected and ink flows at the flow rate required for the inkjet head.

A printing method in accordance with some embodiments of the present invention is a printing method in an inkjet printer. The inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from m the inkjet head; and an ink path connecting the ink tank with the inkjet head. The printing method includes performing the printing in a state where a parameter related to a flow path resistance of the ink path is set such that a nozzle pressure of each of the nozzles is within a prescribed range enabling ink to be stably ejected and ink flows at a flow rate required for the inkjet head.

The printing method above may include: setting in advance the parameter related to the flow path resistance of the ink path such that the nozzle pressure of each of the nozzles at a time of printing is within the prescribed range enabling ink to be stably ejected and ink flows at the flow rate required for the inkjet head; and then performing printing.

Next, a second embodiment of the present invention will be described with reference to FIGS. 7 to 13. The inkjet printer 1 according to the first embodiment makes it possible to suppress the range of the nozzles capable of stably ejecting ink from narrowing and to print a wide image in one attempt. In the inkjet printer in which the flow path resistance of the ink path is set as in the first embodiment, for example, the inkjet head is rotatable or movable to change the ejection direction of ink. However, in the configuration in which the height position of the inkjet head changes due to the rotation or movement, the flow path resistance of the ink path may not be appropriate due to rotating or moving the inkjet head, and thus the range of the nozzles capable of stably ejecting ink may narrow. As a result, it may not be possible to print a desired wide image in one attempt. Accordingly, an object of the present invention in the second embodiment is to provide an inkjet printer, a flow path resistance adjustment method, and a printing method that are capable of reducing the inability to print a wide image in one attempt even when the height position of the inkjet head changes.

Figure 7:
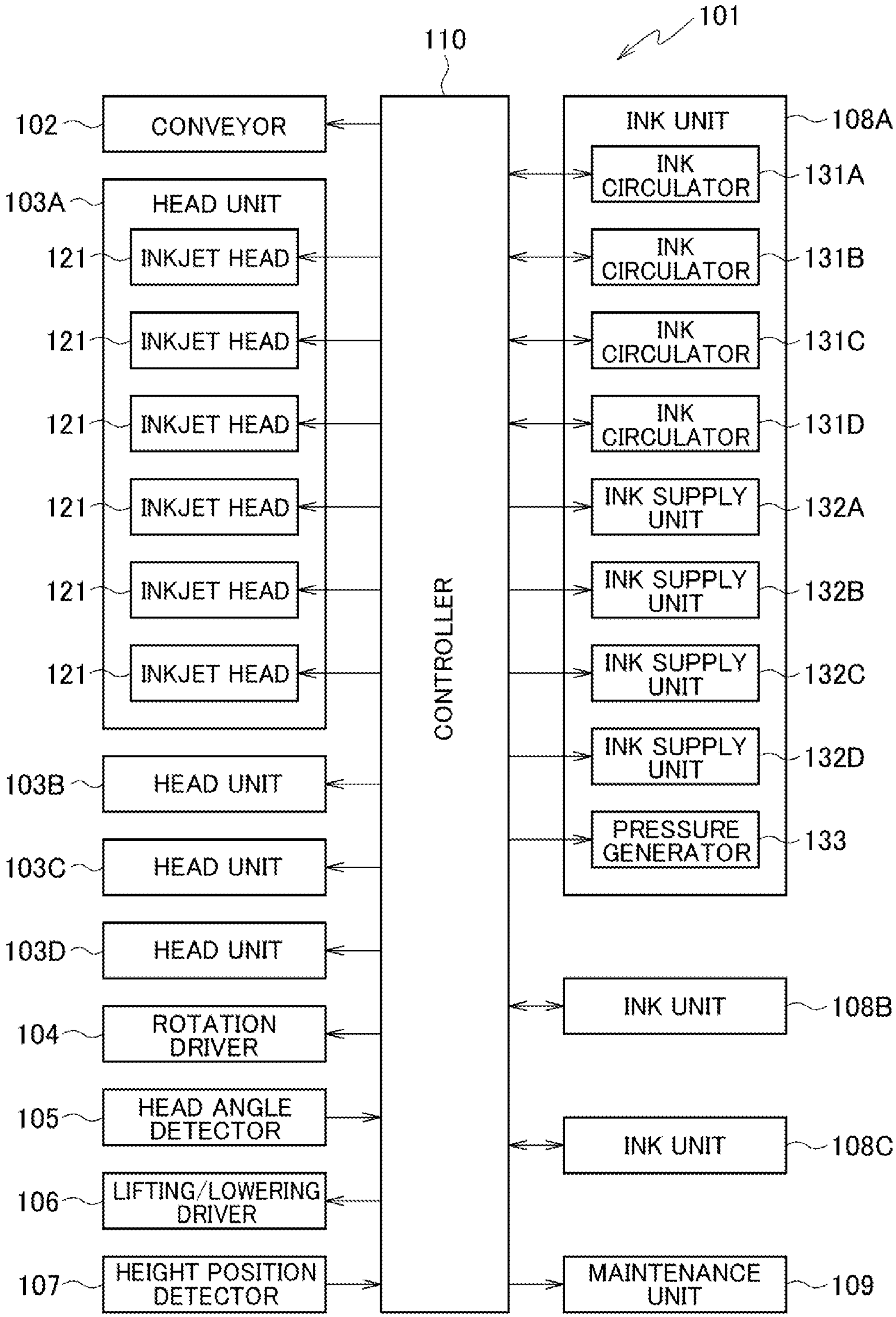
FIG. 7 is a block diagram illustrating a configuration of an inkjet printer according to a second embodiment.
Figure 8:
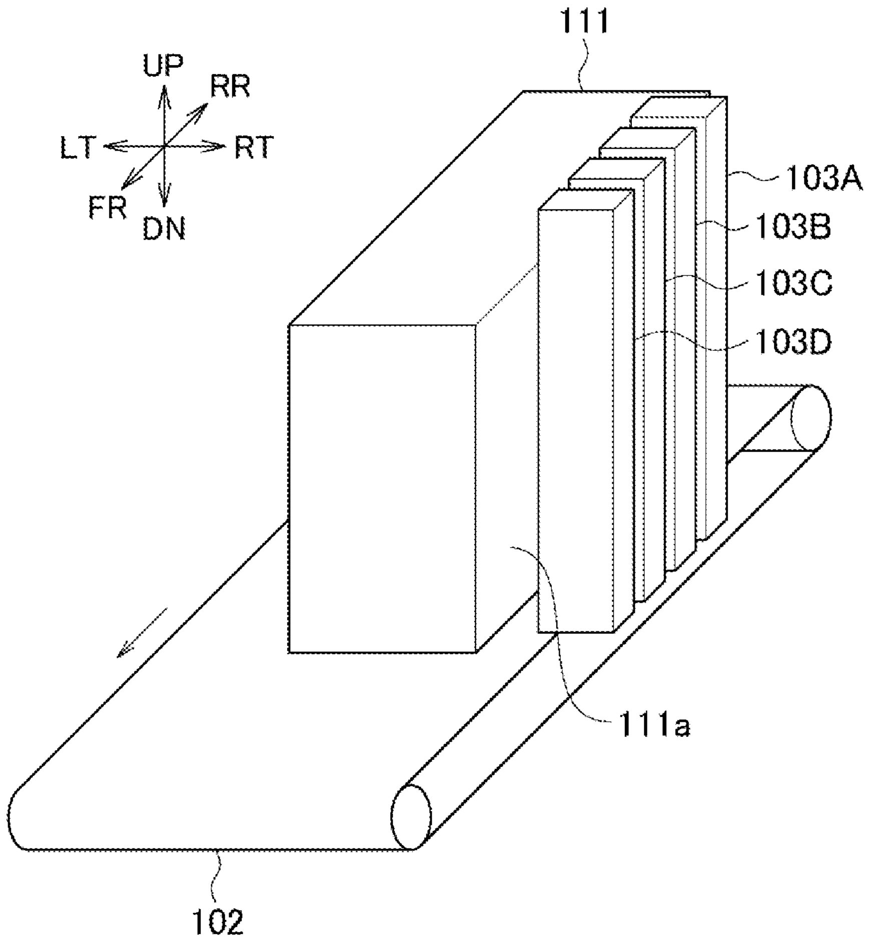
FIG. 8 is a schematic configuration diagram of a conveyor and head units of the inkjet printer illustrated in FIG. 7.
Figure 9:
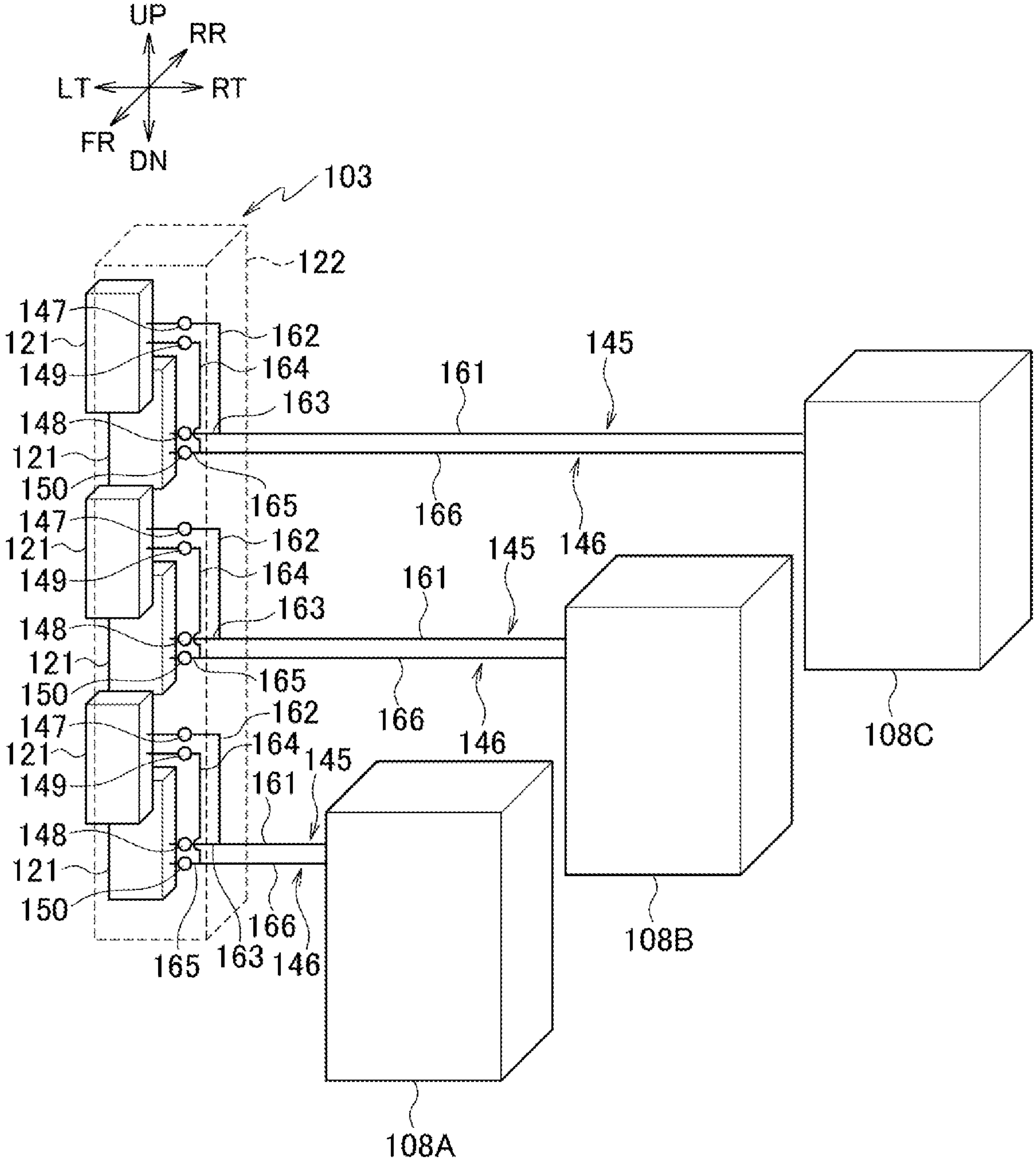
FIG. 9 is a schematic configuration diagram of the head units and ink units of the inkjet printer illustrated in FIG. 7.
Figure 10:
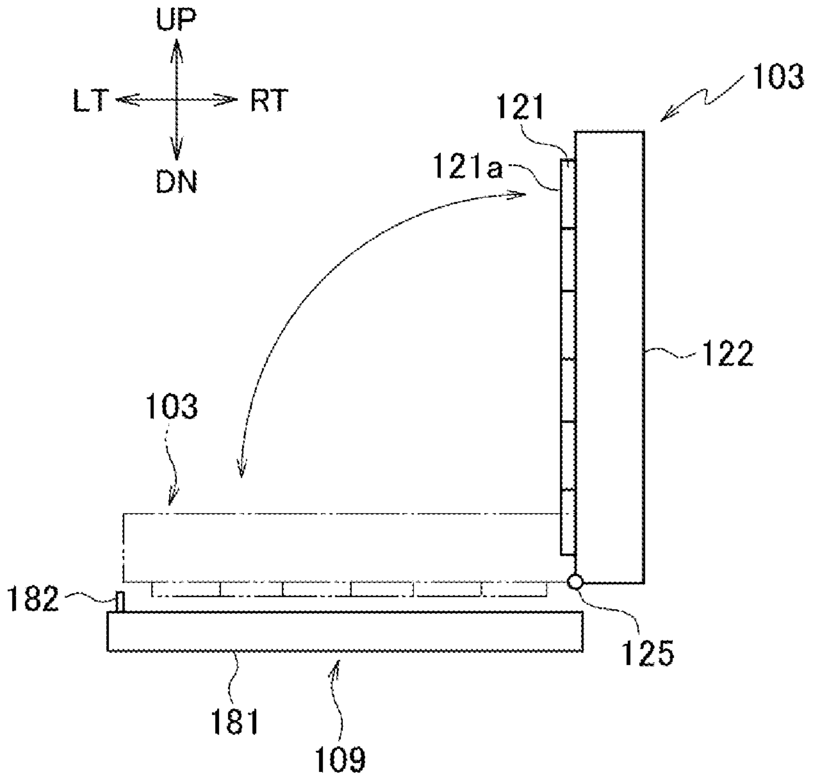
FIG. 10 is a schematic configuration diagram of a maintenance unit of the inkjet printer illustrated in FIG. 7.
Figure 11:
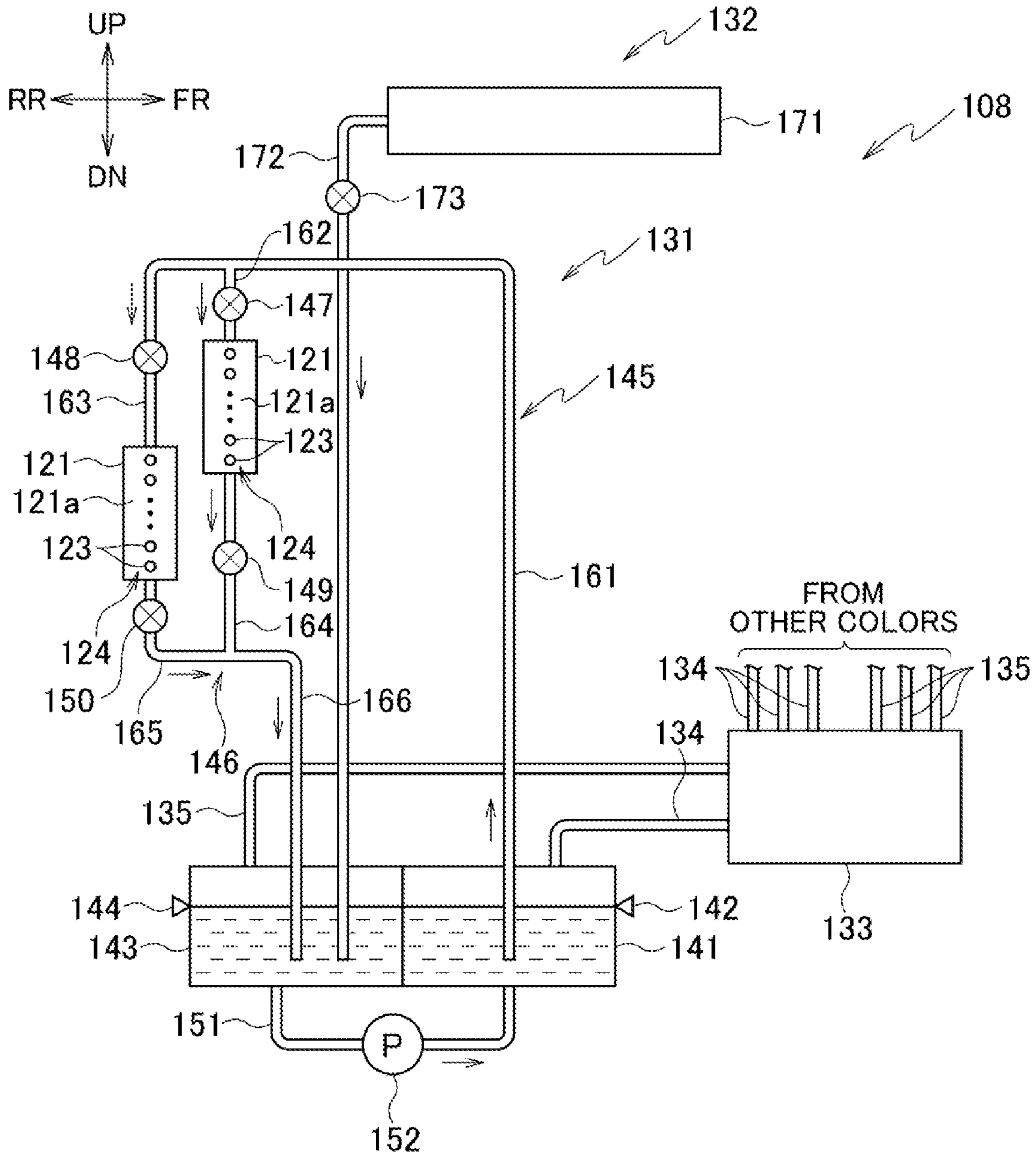
FIG. 11 is a schematic configuration diagram of the ink units of the inkjet printer illustrated in FIG. 7.

FIG. 7 is a block diagram illustrating the configuration of an inkjet printer 101 according to the second embodiment. FIG. 8 is a schematic configuration diagram of a conveyor 102 and head units 103A to 103D of the inkjet printer 101 illustrated in FIG. 7. FIG. 9 is a schematic configuration diagram of the head units 103A to 103D and ink units 108A to 108C of the inkjet printer 101 illustrated in FIG. 7. FIG. 10 is a schematic configuration diagram of a maintenance unit 109 of the inkjet printer 101 illustrated in FIG. 7. FIG. 11 is a schematic configuration diagram of the ink units 108A to 108C of the inkjet printer 101 illustrated in FIG. 7. FIG. 12 is a diagram illustrating a flow path resistance table 186. In FIGS. 8 to 11, the right, left, up, down, front and rear directions are denoted as RT, LT, UP, DN, FR and RR, respectively. The up-down direction is the vertical direction, and the left-right and the front-rear directions are orthogonal to each other and both of the left-right and front-rear directions are orthogonal to the up-down direction and parallel to the horizontal direction.

As illustrated in FIG. 7, the inkjet printer 101 includes the conveyor 102, the head units 103A to 103D, a rotation driver 104, a height position detector 107, a lifting/lowering driver 106, a head angle detector 105, the ink units 108A to 108C, the maintenance unit 109, and a controller 110. Note that the head units 103A to 103D and the like may be referred to in a collective manner with the alphabetical suffixes in the reference numerals being omitted.

The conveyor 102 conveys a printing medium 111 in the conveyance direction parallel to the horizontal direction (in the front direction in FIG. 8). The printing medium 111 is, for example, a cardboard box. The printing medium 111 has a printed surface 111*a* on which printing is performed by the head unit 103. In the example illustrated in FIG. 8, the printed surface 111*a* (vertical surface) is a surface orthogonal to the horizontal direction in a state where the printing medium 111 is placed and conveyed on the conveyor 102. In the inkjet printer 101, the printed surface 111*a* is not limited to a vertical surface, and may be a horizontal surface or a surface inclined downward to the right in FIG. 8.

The head units 103A to 103D eject ink onto the printed surface 111*a* of the printing medium 111 to perform printing. The head units 103A to 103D eject ink of different colors (for example, black, cyan, magenta, and yellow). The head units 103A to 103D have similar configurations except that the color of the ink to be ejected differs. As illustrated in FIG. 8, the head units 103A to 103D are arranged along the conveyance direction of the printing medium 111.

The head unit 103 is rotatable between the vertical state indicated by the solid lines and the horizontal state indicated by the two-dot chain lines in FIG. 10. The head units 103A to 103D are rotatable as one unit. In the vertical state, a nozzle surface 121*a* of an inkjet head 121 described later is a vertical surface, and a row direction of nozzles 123 described later is an up-down direction. In the horizontal state, the nozzle surface 121*a* is the horizontal surface, and the row direction of the nozzles 123 is the horizontal direction (left-right direction). The head unit 103 is capable of ejecting ink and performing printing both in the vertical state and in the horizontal state, or in a state between the vertical state and the horizontal state, that is, in a state where the nozzle surface 121*a* is inclined downward to the right. In other words, the head unit 103 can perform printing by ejecting ink even in a state where the row direction of the nozzles 123 is the horizontal direction or a non-horizontal direction.

The head units 103A to 103D can be lifted/lowered (movable in the vertical direction) as one unit. The head units 103A to 103D can be lifted/lowered as one unit in any of the vertical state, the horizontal state, and the state where the nozzle surface 121*a* is inclined downward to the right.

As illustrated in FIG. 9 and FIG. 10, the head unit 103 includes a plurality of inkjet heads 121 and a head holder 122. In the present embodiment, the head unit 103 includes six inkjet heads 121.

In the head unit 103, six inkjet heads 121 are arranged in such a way that the respective positions thereof are staggered in the row direction of the nozzles 123 described later (in the up-down direction when the head unit 103 is in the vertical state). Specifically, in the head unit 103, six inkjet heads 121 are staggered along the row direction of the nozzles 123. That is, in the head unit 103, six inkjet heads 121 arranged along the row direction of the nozzles 123 are arranged with the respective positions thereof staggered alternately in the front-rear direction.

The inkjet head 121 ejects ink onto the printed surface 111*a* of the printing medium 111. The inkjet head 121 has a nozzle row 124 (see FIG. 11) in which a plurality of nozzles 123 for ejecting ink are linearly arranged at a predetermined pitch. For example, in the state where the head unit 103 is in the vertical state, the row direction of the nozzles 123 in the nozzle row 124 is the direction orthogonal to the horizontal direction (the up-down direction).

The nozzles 123 are open at the nozzle surface 121*a* of the inkjet head 121. The nozzles 123 eject ink in the direction orthogonal to the nozzle surface 121*a*. That is, for example, the nozzles 123 eject ink in the horizontal direction when printing is performed on the printed surface 111*a* of the printing medium 111 with the head unit 103 in the vertical state.

The head holder 122 holds the inkjet heads 121. The head holder 122 holds each of the inkjet heads 121 such that the nozzle surfaces 121*a* of all the inkjet heads 121 are arranged in the same plane. The head holder 122 is provided with a rotating shaft 125 extending in the front-rear direction, which is parallel to the nozzle surface 121*a* and orthogonal to the row direction of the nozzles 123. The head unit 103 can be rotated between the vertical state and horizontal state around the rotating shaft 125. As described above, since the head units 103A to 103D can be rotated as one unit, all the inkjet heads 121 can be rotated as one unit.

In FIG. 10, the rotating shaft 125 is arranged at the left end of the lower end of the head holder 122 with the head unit 103 in the vertical state; however, the present invention is not limited to this configuration. For example, the rotating shaft 125 may be arranged at the right end of the lower end of the head holder 122 with the head unit 103 in the vertical state.

The rotation driver 104 rotates the head units 103A to 103D. The rotation driver 104 has a motor or the like.

The head angle detector 105 detects the head angle. The head angle is an inclined angle of the nozzle surface 121*a* of the inkjet head 121. When the head unit 103 is in the vertical state, the head angle is 90 degrees, and when the head unit 103 is in the horizontal state, the head angle is 0 degrees.

The lifting/lowering driver 106 lifts and lowers the head units 103A to 103D. The lifting/lowering driver 106 has a motor or the like. As described above, since the head units 103A to 103D can be lifted/lowered as one unit, all the inkjet heads 121 can be lifted/lowered as one unit.

The height position detector 107 detects the height positions of the head units 103A to 103D (the position in the up-down direction). The height positions of the head units 103A to 103D are equal to the height position of the rotating shaft 125.

The ink units 108A to 108C supply ink to the head units 103A to 103D. The ink unit 108A supplies ink to the inkjet heads 121 that are first and second from the bottom in each of the head units 103A to 103D. The ink unit 108B supplies ink to the inkjet heads 121 that are third and fourth from the bottom in each of the head units 103A to 103D. The ink unit 108C supplies ink to the inkjet heads 121 that are fifth and sixth from the bottom in each of the head units 103A to 103D.

In FIG. 9, only one head unit 103 is illustrated and the other three head units 103 are not illustrated. The first, second, . . . and sixth inkjet heads 121 from the bottom refer to the first, second, . . . and sixth inkjet heads 121 from the bottom when the head unit 103 is set in the vertical state.

The ink units 108 include ink circulators 131A to 131D, ink supply units 132A to 132D, a pressure generator 133, four positive pressure air paths 134 (see FIG. 11), and four negative pressure air paths 135 (see FIG. 11).

The ink circulators 131A to 131D supply ink to the inkjet heads 121 while circulating ink. The ink circulators 131A to 131D are connected to two inkjet heads 121 in each of the head units 103A to 103D, and supply ink to the two inkjet heads 121.

Specifically, the ink circulators 131A to 131D of the ink unit 108A supply ink to the inkjet heads 121 that are first and second from the bottom in each of the head units 103A to 103D. The ink circulators 131A to 131D of the ink unit 108B supply ink to the inkjet heads 121 that are third and fourth from the bottom in each of the head units 103A to 103D. The ink circulators 131A to 131D of the ink unit 108C supply ink to the inkjet heads 121 that are fifth and sixth from the bottom in each of the head units 103A to 103D.

As illustrated in FIG. 11, the ink circulator 131 includes: a positive pressure tank 141 (ink tank); a positive pressure tank liquid level sensor 142; a negative pressure tank 143 (ink tank); a negative pressure tank liquid level sensor 144; a positive pressure ink path 145 (ink path); a negative pressure ink path 146 (ink path); adjustment valves (adjuster) 147 to 150; a pump liquid delivery path 151; and an ink pump 152.

The positive pressure tank 141 stores ink to be supplied to the inkjet head 121. The positive pressure tank 141 receives a positive pressure for delivering ink to the inkjet head 121, from the pressure generator 133. The positive pressure tank 141 is placed at a lower position than the inkjet head 121 placed at a lower position (the lower inkjet head 121) with the head units 103 in the vertical state among two inkjet heads 121 connected to the ink circulator 131 including the positive pressure tank 141.

Of two inkjet heads 121 connected to the ink circulator 131, the inkjet head at a higher position with the head unit 103 in the vertical state is the upper inkjet head 121, and the inkjet head at a lower position with the head unit 103 in the vertical state is the lower inkjet head 121.

The positive pressure tank liquid level sensor 142 detects whether or not the liquid level of ink in the positive pressure tank 141 has reached the reference height. The positive pressure tank liquid level sensor 142 outputs a signal indicating "on" when the liquid level in the positive pressure tank 141 is equal to or greater than the reference height, and outputs a signal indicating "off" when it is less than the reference height.

The negative pressure tank 143 receives and stores ink that has not been consumed by the inkjet head 121. The negative pressure tank 143 stores ink supplied from the ink supply unit 132. The negative pressure tank 143 receives a negative pressure for recovering ink from the inkjet head 121, from the pressure generator 133. The negative pressure tank 143 is configured of a tank having the same shape as the positive pressure tank 141 and is placed at the same height as the positive pressure tank 141.

The negative pressure tank liquid level sensor 144 detects whether or not the liquid level of ink in the negative pressure tank 143 has reached the reference height. The reference height in the negative pressure tank 143 is the same as the reference height in the positive pressure tank 141. The negative pressure tank liquid level sensor 144 outputs a signal indicating "on" when the liquid level in the negative pressure tank 143 is equal to or greater than the reference height, and outputs a signal indicating "off" when it is less than the reference height.

The positive pressure ink path 145 connects the positive pressure tank 141 with two inkjet heads 121. Ink supplied from the positive pressure tank 141 to two inkjet heads 121 flows through the positive pressure ink path 145. The positive pressure ink path 145 includes a positive pressure common path 161, a positive pressure upper head path (positive pressure branch path) 162, and a positive pressure lower head path (positive pressure branch path) 163.

The positive pressure common path 161 is a common path for ink flowing from the positive pressure tank 141 to the upper inkjet head 121 and ink flowing from the positive pressure tank 141 to the lower inkjet head 121. The upstream end of the positive pressure common path 161 in the circulation direction of ink in the ink circulator 131 is connected to the positive pressure tank 141, and the downstream end thereof is connected to the upstream end of the positive pressure upper head path 162 and the upstream end of the positive pressure lower head path 163.

The circulation direction of ink in the ink circulator 131 is a direction that heads toward the inkjet head 121 from the positive pressure tank 141 along the positive pressure ink path 145 and returns from the inkjet head 121 to the positive pressure tank 141 via the negative pressure tank 143.

The positive pressure upper head path 162 is a path through which ink flows from the positive pressure common path 161 to the upper inkjet head 121. The upstream end of the positive pressure upper head path 162 in the circulation direction of ink is connected to the downstream end of the positive pressure common path 161 and the upstream end of the positive pressure lower head path 163, and the downstream end thereof is connected to the upper inkjet head 121.

The positive pressure lower head path 163 is a path through which ink flows from the positive pressure common path 161 to the lower inkjet head 121. The upstream end of the positive pressure lower head path 163 in the circulation direction of ink is connected to the downstream end of the positive pressure common path 161 and the upstream end of the positive pressure upper head path 162, and the downstream end thereof is connected to the lower inkjet head 121.

The negative pressure ink path 146 connects two inkjet heads 121 with the negative pressure tank 143. Ink that has not been consumed in two inkjet heads 121 and has been recovered into the negative pressure tank 143 flows through the negative pressure ink path 146. The negative pressure ink path 146 includes a negative pressure upper head path (negative pressure branch path) 164, a negative pressure lower head path (negative pressure branch path) 165, and a negative pressure common path 166.

The negative pressure upper head path 164 is a path through which ink flows from the upper inkjet head 121 to the negative pressure common path 166. The upstream end of the negative pressure upper head path 164 in the circulation direction of ink is connected to the upper inkjet head 121, and the downstream end thereof is connected to the upstream end of the negative pressure common path 166 and the downstream end of the negative pressure lower head path 165.

The negative pressure lower head path 165 is a path through which ink flows from the lower inkjet head 121 to the negative pressure common path 166. The upstream end of the negative pressure lower head path 165 in the circulation direction of ink is connected to the lower inkjet head 121, and the downstream end thereof is connected to the upstream end of the negative pressure common path 166 and the downstream end of the negative pressure upper head path 164.

The negative pressure common path 166 is a common path for ink flowing from the upper inkjet head 121 to the negative pressure tank 143 and ink flowing from the lower inkjet head 121 to the negative pressure tank 143. The upstream end of the negative pressure common path 166 in the circulation direction of ink is connected to the downstream end of the negative pressure upper head path 164 and the downstream end of the negative pressure lower head path 165, and the downstream end thereof is connected to the negative pressure tank 143.

The adjustment valves 147 to 150 adjust the flow path resistance of the positive pressure upper head path 162, the positive pressure lower head path 163, the negative pressure upper head path 164, and the negative pressure lower head path 165, respectively. The adjustment valves 147 to 150 adjust the flow path resistance by adjusting the diameter of the flow path, which is a parameter related to the flow path resistance.

The pump liquid delivery path 151 is a path through which ink delivered by the ink pump 152 flows from the negative pressure tank 143 to the positive pressure tank 141. The upstream end of the pump liquid delivery path 151 in the circulation direction of ink is connected to the negative pressure tank 143, and the downstream end thereof is connected to the positive pressure tank 141.

The ink pump 152 delivers ink from the negative pressure tank 143 to the positive pressure tank 141. The ink pump 38 is provided in the middle of the pump liquid delivery path 151.

The ink supply units 132A to 132D supply ink to the ink circulators 131A to 131D, respectively. The ink supply unit 132 includes an ink cartridge 171, an ink supply path 172, and an ink supply valve 173.

The ink cartridge 171 contains ink used for printing performed by the inkjet head 121. The ink in the ink cartridge 171 is supplied to the negative pressure tank 143 of the ink circulator 131 via the ink supply path 172.

The ink supply path 172 connects the ink cartridge 171 with the negative pressure tank 143. In the ink supply path 172, ink flows from the ink cartridge 171 toward the negative pressure tank 143.

The ink supply valve 173 opens and closes the flow path of ink in the ink supply path 172. The ink supply valve 173 opens when ink is supplied to the negative pressure tank 143.

The pressure generator 133 generates a pressure for ink circulation in the positive pressure tank 141 and the negative pressure tank 143 of the ink circulator 131. Specifically, the pressure generator 133 draws air from the negative pressure tank 143 through the negative pressure air path 135 and sends air to the positive pressure tank 141 through the positive pressure air path 134, thereby applying a positive pressure to the positive pressure tank 141 and applying a negative pressure to the negative pressure tank 143. The pressure generator 133 is used for each of the ink circulators 131A to 131D.

The positive pressure air path 134 connects the pressure generator 133 with an air layer on the liquid surface of ink of the positive pressure tank 141. The positive pressure air path 134 is provided corresponding to each of the ink circulators 131A to 131D.

The negative pressure air path 135 connects the pressure generator 133 with an air layer on the liquid surface of ink of the negative pressure tank 143. The negative pressure air path 135 is provided corresponding to each of the ink circulators 131A to 131D.

The maintenance unit 109 performs cleaning of the nozzle surface 121*a* of each inkjet head 121 of the head units 103A to 103D. The maintenance unit 109 is movable between a deployed position where the maintenance unit 109 is placed when performing cleaning of the inkjet head 121, and a retracted position to which the maintenance unit 109 is retracted from the deployed position. The deployed position is the position of the maintenance unit 109 illustrated in FIG. 10, which is a position immediately below the head unit 103 in the horizontal state placed at a predetermined cleaning height position. The maintenance unit 109 in the retracted position is not illustrated. The maintenance unit 109 includes an ink receiving unit 181 and a wiper 182 as illustrated in FIG. 10.

The ink receiving unit 181 receives ink or the like to be removed from the nozzle surface 121*a* by wiping using the wiper 182 at the time of cleaning of the inkjet head 121.

The wiper 182 wipes the nozzle surface 121*a* of the inkjet head 121 to remove ink or the like on the nozzle surface 121*a*. The maintenance unit 109 is provided with a wiper 182 for wiping the front three inkjet heads 121 and a wiper 182 for wiping the rear three inkjet heads 121, out of six inkjet heads 121 arranged in a staggered manner for each of the head units 103A to 103D. That is, eight wipers 182 are provided in total in the maintenance unit 109.

The controller 110 controls the operation of each unit of the inkjet printer 101. The controller 110 is configured of a CPU, RAM, ROM, hard disk, or the like.

The controller 110 stores the flow path resistance table 186 illustrated in FIG. 12. The flow path resistance table 186 is a table that correlates the height position and the head angle of the head units 103A to 103D, the flow path resistance $R_{1k}$ of the positive pressure upper head path 162, the flow path resistance $R_{2k}$ of the positive pressure lower head path 163, the flow path resistance $R_{1f}$ of the negative pressure upper head path 164, and the flow path resistance $R_{2f}$ of the negative pressure lower head path 165 with each other for each of the ink units 108A to 108C at the time of printing. The flow path resistance table 186 stores the flow path resistances $R_{1k}$, $R_{2k}$, $R_{1f}$, and $R_{2f}$ at the time of cleaning of the inkjet head 121. The details of the flow path resistances $R_{1k}$, $R_{2k}$, $R_{1f}$, and $R_{2f}$ will be described later.

At the time of printing, the controller 110 controls the adjustment valves 147 to 150 to adjust the flow path resistances $R_{1k}$, $R_{2k}$, $R_{1f}$, and $R_{2f}$ in the ink circulators 131A to 131D of the ink units 108A to 108C with reference to the flow path resistance table 186 based on the height position and the head angle of the head units 103A to 103D. At the time of cleaning of the inkjet head 121, the controller 110 controls the adjustment valves 147 to 150 such that the flow path resistances $R_{1k}$, $R_{2k}$, $R_{1f}$, and $R_{2f}$ in the ink circulators 131A to 131D of the ink units 108A to 108C are adjusted to the values at the time of cleaning with reference to the flow path resistance table 186.

Next, the flow path resistance $R_{1k}$ of the positive pressure upper head path 162, the flow path resistance $R_{2k}$ of the positive pressure lower head path 163, the flow path resistance $R_{1f}$ of the negative pressure upper head path 164, and the flow path resistance $R_{2f}$ of the negative pressure lower head path 165 in the ink circulator 131 described above will be described.

At the time of printing, since the row direction of the nozzles 123 is the non-horizontal direction (the head angle is not 0 degrees), when there is a water head difference between the nozzles 123, and when the height positions of two inkjet heads 121 connected to one ink circulator 131 are different, the flow path resistances $R_{1k}$, $R_{2k}$, $R_{1f}$, and $R_{2f}$ are set to values such that the nozzle pressure of each nozzle 123 in the nozzle row 124 in each inkjet head 121 is within a range enabling ink to be stably ejected (stable ejection range), and such that ink of the same flow rate flows at the flow rate required for each inkjet head 121.

Figure 13:
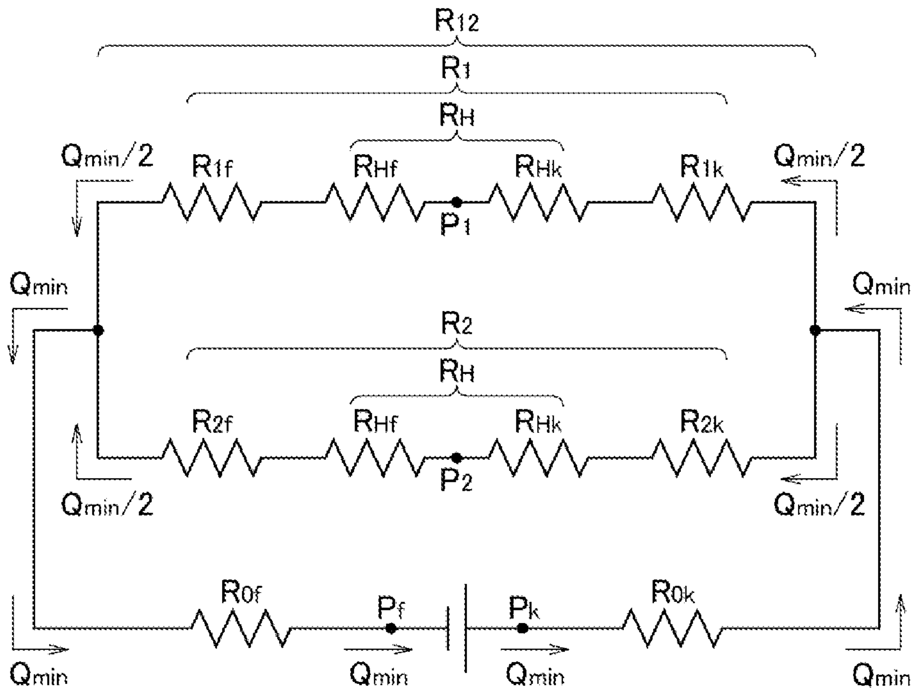
FIG. 13 is a fluid circuit model diagram of an ink circulator of the inkjet printer illustrated in FIG. 7 and two inkjet heads connected to the ink circulator.

FIG. 13 is a fluid circuit model diagram of the ink circulator 131 and two inkjet heads 121 connected to the ink circulator 131.

In FIG. 13, $P_k$ and $P_f$ are the set pressures of the positive pressure tank 141 and the negative pressure tank 143, respectively, at the time of ink circulation (printing). At the time of ink circulation, each pressure of the positive pressure tank 141 and the negative pressure tank 143 is adjusted to $P_k$ and $P_f$, respectively, by using the pressure generator 133.

$P_1$ is an average nozzle pressure of the upper inkjet head 121, and is a nozzle pressure of the center nozzle 123 in the nozzle row 124 of the upper inkjet head 121. $P_2$ is an average nozzle pressure of the lower inkjet head 121, and is a nozzle pressure of the center nozzle 123 in the nozzle row 124 of the lower inkjet head 121. Since a water head difference between the nozzles 123 in the upper inkjet head 121 is generated and a water head difference between the nozzles 123 in the lower inkjet head 121 is generated, $P_1$ which is the average nozzle pressure of the nozzles 123 in the upper inkjet head 121 and $P_2$ which is the average nozzle pressure of the nozzles 123 in the lower inkjet head 121 are used.

$Q_{min}$ is an ink circulation flow rate required at the time of ink circulation (printing).

$R_{0k}$ is a flow path resistance of the positive pressure common path 161. $R_{0k}$ is a fixed value. $R_{1k}$ is a flow path resistance of the positive pressure upper head path 162. $R_{2k}$ is a flow path resistance of the positive pressure lower head path 163.

$R_{0f}$ is a flow path resistance of the negative pressure common path 166. $R_{0f}$ is a fixed value. $R_{1f}$ is a flow path resistance of the negative pressure upper head path 164. $R_{2f}$ is a flow path resistance of the negative pressure lower head path 165.

$R_{Hk}$ is a flow path resistance of the path from an ink inlet port to the nozzles 123 in the inkjet head 121. $R_{Hf}$ is a flow path resistance of the path from the nozzles 123 to an ink outlet port in the inkjet head 121. $R_{Hk}$ and $R_{Hf}$ are fixed values. $R_H$ is a flow path resistance in the inkjet head 121. $R_H$ is expressed by the following equation (1):

$$R_H = R_{Hk} + R_{Hf} \tag{1}$$

$R_1$ is a flow path resistance of the flow path including the positive pressure upper head path 162, the upper inkjet head 121, and the negative pressure upper head path 164. $R_1$ is expressed by the following equation (2):

$$R_1 = R_{1k} + R_H + R_{1f} \tag{2}$$

$R_2$ is a flow path resistance of the flow path including the positive pressure lower head path 163, the lower inkjet head 121, and the negative pressure lower head path 165. $R_2$ is expressed by the following equation (3):

$$R_2 = R_{2k} + R_H + R_{2f} \tag{3}$$

$R_{12}$ is a flow path resistance between the downstream end of the positive pressure common path 161 and the upstream end of the negative pressure common path 166. $R_{12}$ is expressed by the following equation (4):

$$R_{12} = R_1 \times R_2 / (R_1 + R_2) \tag{4}$$

When a flow path resistance of the entire path from the positive pressure tank 141 to the negative pressure tank 143 via the inkjet head 121 is assumed to be R, R is expressed by the following equation (5):

$$R = R_{0k} + R_{12} + R_{0f} \tag{5}$$

As described above, the flow path resistance $R_{1k}$, the flow path resistance $R_{2k}$, the flow path resistance $R_{1f}$, and the flow path resistance $R_{2f}$ are set such that the nozzle pressure of each nozzle 123 in the nozzle row 124 in two inkjet heads 121 is within a stable ejection range, and such that ink of the same flow rate flows at the flow rate required for the two inkjet heads 121.

Specifically, $R_{1k}$, $R_{2k}$, $R_{1f}$, and $R_{2f}$ are set such that the following equations (6) to (8) hold.

$$P_1 = P_2 = P_{typ} \tag{6}$$

$$R_1 = R_2 \tag{7}$$

$$R = (P_k - P_f) / Q_{min} \tag{8}$$

Equation (6) described above shows the conditions for ensuring that a nozzle pressure of each nozzle 123 in the nozzle row 124 in two inkjet heads 121 is within a stable ejection range. The reason for the condition that Equation (6) is to hold is as follows:

In the ink circulator 131 and two inkjet heads 121 connected to the ink circulator 131, when the following equation (9) holds, a nozzle pressure of each nozzle 123 in the nozzle row 124 in two inkjet heads 121 is within a stable ejection range.

$$\Delta P \geq P_{Hh} + |P_1 - P_2| + P\sigma \tag{9}$$

Here, $\Delta P$ is the difference ($P_{max} - P_{min}$) between the upper limit of the stable ejection range (maximum nozzle pressure $P_{max}$ at which stable ejection can be performed) and the lower limit of the stable ejection range (minimum nozzle pressure $P_{min}$ at which stable ejection can be performed).

$P_{Hh}$ is a water head difference in the inkjet head 121. Specifically, $P_{Hh}$ is the difference ($P_{nl} - P_{nu}$) between the nozzle pressure $P_{nl}$ of the nozzles 123 at the lower end in the nozzle row 124 of the inkjet head 121 and the nozzle pressure $P_{nu}$ of the nozzles 123 at the upper end thereof.

$P\sigma$ is the variation (dispersion) of the nozzle pressure in two inkjet heads 121. $P\sigma$ is determined by the performance of the pressure generator 133, the variation of each component, or the like.

As can be seen from Equation (9), Equation (9) is likely to hold as the value of $|P_1 - P_2|$ decreases. For this reason, in the present embodiment, $P_1 = P_2$ is obtained as can be seen in Equation (6). This eliminates the pressure difference due to the water head difference between the upper inkjet head 11 and the lower inkjet head 121, thereby making it easier for Equation (9) to hold. In the present embodiment, the ink circulator 131 and the inkjet head 121 are configured such that $P_{Hh}$ and $P\sigma$ become values for which Equation (9) holds when $P_1 = P_2$ is obtained.

$P_{typ}$ in Equation (6) is a value of the nozzle pressure to be set in the inkjet head 121 (target value). $P_{typ}$ is set to a value between $P_{max}$ and $P_{min}$.

Equation (7) described above shows the conditions for allowing ink of the same flow rate to flow through two inkjet heads 121. Equation (8) described above shows the conditions for ensuring a flow rate of ink required for printing performed by two inkjet heads 121. The reason for the condition that Equations (7) and (8) are to hold is to cause ink of the same flow rate to flow at the flow rate required for two inkjet heads 121.

$P_1$ is expressed by the following equation (10) when calculated using the positive pressure tank 141.

(Math. 1)

$$P_1 = P_k + P_{1h} - (P_k - P_f) \times \left\{ \frac{R_{0k}}{R} + \frac{R_{12} \times (R_{1k} + R_{Hk})}{R \times R_1} \right\} \tag{10}$$

$P_{1h}$ is a water head pressure of the upper inkjet head 121.

$P_1$ is expressed by the following equation (11) when calculated using the negative pressure tank 143.

(Math. 2)

$$P_1 = P_f + P_{1h} + (P_k - P_f) \times \left\{ \frac{R_{0f}}{R} + \frac{R_{12} \times (R_{1f} + R_{Hf})}{R \times R_1} \right\} \tag{11}$$

$P_2$ is expressed by the following equation (12) when calculated using the positive pressure tank 141.

(Math. 3)

$$P_2 = P_k + P_{2h} - (P_k - P_f) \times \left\{ \frac{R_{0k}}{R} + \frac{R_{12} \times (R_{2k} + R_{Hk})}{R \times R_2} \right\} \tag{12}$$

$P_{2h}$ is a water head pressure of the lower inkjet head 121.

$P_2$ is expressed by the following equation (13) when calculated using the negative pressure tank 143.

(Math. 4)

$$P_2 = P_f + P_{2h} + (P_k - P_f) \times \left\{ \frac{R_{0f}}{R} + \frac{R_{12} \times (R_{2f} + R_{Hf})}{R \times R_2} \right\} \tag{13}$$

From Equations (1) to (13), the following equations (14) to (17) are obtained.

(Math. 5)

$$R_{1k} = 2 \times \left( \frac{P_k + P_{1h} - P_{typ}}{Q_{min}} - R_{0k} \right) - R_{Hk} \tag{14}$$

$$R_{2k} = 2 \times \left( \frac{P_k + P_{2h} - P_{typ}}{Q_{min}} - R_{0k} \right) - R_{Hk} \tag{15}$$

$$R_{1f} = -2 \times \left( \frac{P_f + P_{1h} - P_{typ}}{Q_{min}} - R_{0f} \right) - R_{Hf} \tag{16}$$

$$R_{2f} = -2 \times \left( \frac{P_f + P_{2h} - P_{typ}}{Q_{min}} - R_{0f} \right) - R_{Hf} \tag{17}$$

The water head pressure $P_{1h}$ of the upper inkjet head 121 in Equations (14) and (16) and the water head pressure $P_{2h}$ of the lower inkjet head 121 in Equations (15) and (17) are different depending on the height position of each inkjet head 121. The height position of each inkjet head 121 varies according to the height position of the head unit 103 and the head angle.

In contrast, in the inkjet printer 101, the flow path resistances $R_{1k}$, $R_{2k}$, $R_{1f}$, and $R_{2f}$ in each of the ink circulators 131A to 131D of the ink units 108A to 108C, which are calculated in advance according to the height position and the head angle of the head unit 103, that is, according to the height position of each inkjet head 121, are stored in the flow path resistance table 186.

By setting the flow path resistances $R_{1k}$, $R_{2k}$, $R_{1f}$, and $R_{2f}$ to the values calculated as described above, when the row direction of the nozzles 123 is the non-horizontal direction (the head angle is not 0 degrees), the flow path resistance $R_{2k}$ of the positive pressure lower head path 163 is greater than the flow path resistance $R_{1k}$ of the positive pressure upper head path 162 at the upstream side of the inkjet head 121. The flow path resistance $R_{2f}$ of the negative pressure lower head path 165 is smaller than the flow path resistance $R_{1f}$ of the negative pressure upper head path 164 at the downstream side of the inkjet head 121. Thereafter, the pressure difference caused by the water head difference between the upper inkjet head 121 and the lower inkjet head 121 is canceled out.

At the time of cleaning of the inkjet head 121, the flow path resistances $R_{1k}$, $R_{2k}$, $R_{1f}$, and $R_{2f}$ are set to such values that the same prescribed amount of ink is ejected from each nozzle 123 of each inkjet head 121 by purging.

Purging is a process in which ink is delivered from the positive pressure tank 141 to two inkjet heads 121 via the positive pressure ink path 145 to eject ink from each nozzle 123 of the two inkjet heads 121. In the inkjet printer 101, purging is performed with the head units 103A to 103D in the horizontal state placed at the predetermined cleaning height position. At the time of purging, the positive pressure tank 141 receives a positive pressure for purging, and the negative pressure tank 143 is brought into an open-air state.

For this reason, the flow path resistances $R_{1k}$, $R_{2k}$, $R_{1f}$, and $R_{2f}$ at the time of cleaning of the inkjet head 16 are calculated by setting $P_k$ in Equations (14) and (15) as the positive pressure for purging, setting $P_f$ in Equations (16) and (17) as the atmospheric pressure, setting $P_{1h}$ in Equations (14) and (16) and $P_{2h}$ in Equations (15) and (17) as the values when the head units 103A to 103D are arranged at the prescribed height position for cleaning in the horizontal state, and setting $P_{typ}$ and $Q_{min}$ in Equations (14) to (17) as the values of the nozzle pressure and the circulation flow rate, respectively, which enable the prescribed amount of ink to be ejected by purging. In the inkjet printer 101, the flow path resistances $R_{1k}$, $R_{2k}$, $R_{1f}$, and $R_{2f}$ at the time of cleaning calculated in this way are stored in the flow path resistance table 186.

Next, the operation of the inkjet printer 101 will be described.

When printing is performed in the inkjet printer 101, the controller 110 controls the rotation driver 104 and the lifting/lowering driver 106 to set the height position and the head angle of the head units 103A to 103D to the height position and the angle corresponding to the height position and the inclined angle of the printed surface 111*a* of the printing medium 111. The height position and the head angle of the head units 103A to 103D corresponding to the height position and the inclined angle of the printed surface 111*a* are input, for example, by a user operation from an operation input unit not illustrated in the figures.

Further, the controller 110 also controls the adjustment valves 147 to 150 to adjust the flow path resistances $R_{1k}$, $R_{2k}$, $R_{1f}$, and $R_{2f}$ in the ink circulators 131A to 131D of the ink units 108A to 108C with reference to the flow path resistance table 186 based on the set height position and the set head angle of the head units 103A to 103D. Thus, the control of adjusting the parameters related to the flow path resistances of the ink paths in conjunction with the set height position and the set head angle of the head units 103A to 103D (i.e. positioning adjustment) is automatically performed by the controller 110.

Next, when a print job is input, the controller 110 starts ink circulation in the ink circulators 131A to 131D of the ink units 108A to 108C. Specifically, the controller 110 controls the pressure generator 133 of the ink units 108A to 108C to generate the set pressures $P_k$ and $P_f$ for ink circulation in the positive pressure tank 141 and the negative pressure tank 143, respectively. This starts ink circulation in the ink circulators 131A to 131D, and ink flows from the positive pressure tank 141 to the negative pressure tank 143 via the inkjet head 121.

When the ink circulation starts, the controller 110 starts executing a print job. Specifically, the conveyor 102 conveys the printing medium 111 and the controller 110 performs control to print an image on the printing medium 111 by ejecting ink from each inkjet head 121 of the head units 103A to 103D.

While executing the print job, ink is supplied from the positive pressure tank 141 to the inkjet head 121, and ink that has not been consumed in the inkjet head 121 is recovered into the negative pressure tank 143. When the positive pressure tank liquid level sensor 142 is turned off and the negative pressure tank liquid level sensor 144 is turned on, the controller 110 drives the ink pump 152. Thus, ink is delivered from the negative pressure tank 143 to the positive pressure tank 141. When the positive pressure tank liquid level sensor 142 is turned on, the controller 6 stops the ink pump 152. In this way, ink is circulated to perform printing.

When the pressure tank liquid level sensor 142 and the negative pressure tank liquid level sensor 144 are both turned off, the controller 110 opens the ink supply valve 173. Thus, ink is supplied from the ink cartridge 171 to the negative pressure tank 143. When the negative pressure tank liquid level sensor 144 is turned on, the controller 110 closes the ink supply valve 173.

When printing based on the print job is finished, the controller 110 controls the pressure generator 133 to finish the ink circulation in the ink circulators 131A to 131D.

Next, the operation for cleaning the nozzle surface 121*a* of the inkjet head 121 in the inkjet printer 101 will be described.

When instructed to perform cleaning of the inkjet head 121, the controller 110 controls the rotation driver 104 and the lifting/lowering driver 106 to place the head units 103A to 103D at the height position for cleaning in the horizontal state. In addition, the controller 110 also refers to the flow path resistance table 186 and controls the adjustment valves 147 to 150 to set the flow path resistances $R_{1k}$, $R_{2k}$, $R_{1f}$, and $R_{2f}$ in the ink circulators 131A to 131D of the ink units 108A to 108C to the values at the time of cleaning. In addition, the control unit 110 also places the maintenance unit 109 in the deployed position.

Next, the controller 110 controls the pressure generator 133 of the ink units 108A to 108C to apply a positive pressure for purging to the positive pressure tank 141 of the ink circulators 131A to 131D. The negative pressure tank 143 is open to the atmosphere.

When the positive pressure tank 141 receives a positive pressure for purging, the same prescribed amount of ink is ejected from each nozzle 123 of each inkjet head 121. At least part of the ink ejected from the nozzles 123 by purging adheres to the nozzle surface 121*a*.

Next, the controller 110 controls the maintenance unit 109 to wipe the nozzle surface 121*a* of the inkjet head 121 with the wiper 182, thereby removing dust or the like on the nozzle surface 121*a* together with ink adhering to the nozzle surface 121*a*. As a result, cleaning of the inkjet head 121 is finished.

As described above, in the inkjet printer 101, the controller 110 controls, at the time of printing, the adjustment valves 147 to 150 to adjust the flow path resistances $R_{1k}$, $R_{2k}$, $R_{1f}$, and $R_{2f}$ such that the nozzle pressure of each nozzle 103 in the nozzle row 124 in two inkjet heads 121 connected to the ink circulator 131 is within a stable ejection range in the ink circulators 131A to 131D of the ink units 108A to 108C based on the height position and the head angle of the head units 102A to 103D, that is, based on the height position of each inkjet head 147 to 150, and such that ink of the same flow rate flows at the flow rate required for the two inkjet heads 121.

Thus, even if the height position of each inkjet head 121 changes due to a change in at least one of the height position and the head angle of the head units 103A to 103D, it is possible to suppress the range of the nozzles 123 capable of stably ejecting ink from narrowing even if there is a water head difference between the nozzles 123, and to equally secure the flow rate of ink required for printing, for the two inkjet heads 121 connected to the ink circulator 131. As a result, in the configuration in which two inkjet heads 121 are connected to one ink circulator 131 to simplify the configuration and control of the inkjet printer 1, it is possible to reduce the inability to print a wide image in one attempt. The head units 103A to 103D which eject ink of different colors are arranged along the conveyance direction of the printing medium 111. Thus, it is possible to perform printing in the lateral direction which is printing onto the lateral side of the printing medium 111 (for example, a cubic object such as a cardboard box), in full color and with a wide image.

The controller 110 controls the adjustment valves 147 to 150 to adjust the flow path resistances $R_{1k}$, $R_{2k}$, $R_{1f}$, and $R_{2f}$ in the ink circulators 131A to 131D of the ink units 108A to 108C such that the same prescribed amount of ink is ejected from each nozzle 123 of each inkjet head 121 when purging is performed at the time of cleaning of the inkjet head 121. This suppresses an excessive ejection of ink from the nozzles 123 in the inkjet head 121 by purging, thereby making it possible to suppress the waste of ink.

In the above embodiment, $P_1=P_2$ is used as the condition for the setting of the flow path resistances $R_{1k}$, $R_{2k}$r $R_{1f}$, and $R_{2f}$; however, the present invention is not limited to $P_1=P_2$ as long as a nozzle pressure of each nozzle 133 in each inkjet head 121 is within a stable ejection range.

In the above-described embodiment, the flow path resistances $R_{1k}$, $R_{2k}$, $R_{1f}$, and $R_{2f}$ are adjusted by the adjustment valves 147 to 150; however, the adjustment of the flow path resistances $R_{1k}$, $R_{2k}$, $R_{1f}$, and $R_{2f}$ is not limited to using the adjustment valves 147 to 150. For example, the following configuration may be possible: each of the positive pressure upper head path 162, the positive pressure lower head path 163, the negative pressure upper head path 164, and the negative pressure lower head path 165 may be configured of a tube and an outer tube, and air may be pumped into the gap between the tube and the outer tube or air may be sucked from the gap to change the inner diameter of the tube, thereby adjusting the flow path resistances.

In the above-described embodiment, the diameter of a flow path of ink is adjusted by the adjustment valves 147 to 150 so as to adjust the flow path resistances $R_{1k}$, $R_{2k}$, $R_{1f}$, and $R_{2f}$. However, a parameter related to a flow path resistance other than the diameter of a flow path may be adjusted. In addition to the diameter of a flow path, a parameter related to a flow path resistance includes the length of a flow path, the shape of a flow path, an ink viscosity, a pressure in the positive pressure tank 141, and a pressure in the negative pressure tank 143. In order to adjust the flow path resistances $R_{1k}$, $R_{2k}$, $R_{1f}$, and $R_{2f}$, the adjustment unit that adjusts the parameter related to the flow path resistance may adjust at least any one of the length of the flow path, the diameter of the flow path, the shape of the flow path, an ink viscosity, a pressure in the positive pressure tank 141, and a pressure in the negative pressure tank 143.

The head units 103A to 103D may be manually rotated, and when the head units 103A to 103D are set to the horizontal state, the inkjet printer 101 may be set to a cleaning mode for cleaning the inkjet head 121. In this case, in the cleaning mode, the parameter related to the flow path resistance may be adjusted such that the flow path resistances $R_{1k}$, $R_{2k}$, $R_{1f}$, and $R_{2f}$ become the values at the time of cleaning of the inkjet head 121.

In the head unit 103, each inkjet head 121 may be individually movable along the row direction of the nozzles 123. This movement may be performed manually or automatically by the drive unit using a motor or the like. When the row direction of the nozzles 123 is the non-horizontal direction, the height position of the inkjet head 121 changes when the inkjet head 121 moves in the row direction of the nozzles in the head unit 103. Accordingly, the flow path resistances $R_{1k}$, $R_{2k}$, $R_{1f}$, and $R_{2f}$ corresponding to the height position and the head angle of the head unit 103 and the position of each inkjet head 121 in the head unit 103 in the row direction of the nozzles 123 may be calculated in advance and stored in the table, thereby adjusting the flow path resistances $R_{1k}$, $R_{2k}$, $R_{1f}$, and $R_{2f}$ with reference to this table.

In the above-described embodiment, the head unit 103 can be rotated and can be lifted/lowered; however, the head unit 103 may be configured to be able to be rotated or to be able to be lifted/lowered. When the head unit 103 cannot be rotated but can be lifted/lowered, the head angle may be set at any angle. The rotation and lifting/lowering of the head unit 103 may be performed manually.

The head unit 103 may be at least either not able to be rotated or not able to be lifted/lowered, and individual movements of the respective inkjet heads 121 along the row direction of the nozzles 123 described above may be possible. The head unit 103 may be at least either rotatable around an axis parallel to the nozzle surface 121*a* and extending in a direction orthogonal to the row direction of the nozzles 123, or may be movable in the vertical direction including movements in a state where the row direction of the nozzles 123 is the non-horizontal direction, or may be configured allowing individual movements of the respective inkjet heads 121 along the row direction of the nozzles 123 in a state where the row direction of the nozzles 123 is the non-horizontal direction. However, the present invention is not limited to the above configurations, and it is sufficient as long as the height positions of the respective inkjet heads 121 can be changed.

In the above embodiment, ink is supplied to two inkjet heads 121 by one ink circulator 131; however, ink may be supplied to one inkjet head by one ink circulator. In this case, at the time of printing, the parameter related to the flow path resistance of the positive pressure ink path connecting the positive pressure tank with the inkjet head and the parameter related to the flow path resistance of the negative pressure ink path connecting the inkjet head with the negative pressure tank may be adjusted based on the height position of the inkjet head such that the nozzle pressure of each nozzle is within a stable ejection range, and such that ink flows at the flow rate required for the inkjet head. When purging is performed, the parameter related to the flow path resistance of the positive pressure ink path and the negative pressure ink path may be adjusted such that the same prescribed amount of ink is ejected from each nozzle.

Even in this case, at the time of printing, it is possible to suppress the range of the nozzles 123 capable of stably ejecting ink from narrowing even if there is a water head difference between the nozzles 123 in the inkjet head 121 and to ensure the flow rate of ink required for printing, thereby reducing the inability to print a wide image in one attempt. When performing cleaning of the inkjet head 121, an excessive ejection of ink from the nozzles 123 in the inkjet head 121 is suppressed by purging, thereby making it possible to suppress the waste of ink.

In the above embodiment, ink is supplied to two inkjet heads 121 by one ink circulator 131; however, ink may be supplied to three or more inkjet heads by one ink circulator. Even in this case, at the time of printing, the parameter related to the respective flow path resistances of the plurality of positive pressure branch paths and the plurality of negative pressure branch paths connected to the respective inkjet heads may be adjusted based on the height positions of the respective inkjet heads such that the nozzle pressure of each nozzle in each inkjet head is within a stable ejection range, and such that ink of the same flow rate flows at the flow rate required for each inkjet head. When purging is performed, the parameter related to the respective flow path resistances of the plurality of positive pressure branch paths and the plurality of negative pressure branch paths may be adjusted such that the same prescribed amount of ink is ejected from each nozzle in each inkjet head.

The parameter related to the flow path resistance of the ink path may be adjusted or the flow path resistance itself may be adjusted such that the nozzle pressure of each nozzle in the nozzle rows of the inkjet heads is within a stable ejection range, and such that ink of the same flow rate flows at the flow rate required for each inkjet head.

Embodiments of the disclosure include, for example, the following configuration.

An inkjet printer in accordance with some embodiments of the present invention includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and an ink path connecting the ink tank with the inkjet head. The printing is performed in a state where a parameter related to a flow path resistance of the ink path is set such that a nozzle pressure of each of the nozzles at a time of printing is within a prescribed range enabling ink to be stably ejected and ink flows at a flow rate required for the inkjet head.

The inkjet printer above may further include: an adjuster configured to adjust a parameter related to a flow path resistance of the ink path; and a controller configured to control the adjuster. The inkjet head may be capable of changing a height position thereof. At a time of printing, the controller may control the adjuster to adjust the parameter related to the flow path resistance of the ink path based on the height position of the inkjet head such that a nozzle pressure of each of the nozzles is within a range enabling ink to be stably ejected and ink flows at a flow rate required for the inkjet head.

The ink tank may include: a positive pressure tank configured to store ink supplied to the inkjet head and to receive a positive pressure for delivering ink to the inkjet head; and a negative pressure tank configured to receive ink that has not been consumed in the inkjet head and to receive a negative pressure for recovering ink from the inkjet head. The ink path may include: a positive pressure ink path connecting the positive pressure tank with the inkjet head; and a negative pressure ink path connecting the inkjet head with the negative pressure tank. The adjuster may adjust a parameter related to a flow path resistance of the positive pressure ink path and a parameter related to a flow path resistance of the negative pressure ink path. The inkjet head may be at least either rotatable around an axis extending in a direction parallel to a nozzle surface at which the nozzles are open and orthogonal to the row direction, or is movable in a vertical direction including a movement in a state where the row direction is a non-horizontal direction, or is movable along the row direction in a state where the row direction is the non-horizontal direction. At a time of printing, the controller may control the adjuster to adjust the parameter related to the flow path resistance of the positive pressure ink path and the parameter related to the flow path resistance of the negative pressure ink path based on the height position of the inkjet head such that the nozzle pressure of each of the nozzles is within the range enabling ink to be stably ejected and ink flows at the flow rate required for the inkjet head.

In a state where the row direction is a horizontal direction, the controller may perform purging for cleaning the inkjet head in which ink is delivered from the positive pressure tank to the inkjet head via the positive pressure ink path and is ejected from each of the nozzles. Upon performing the purging, the controller may control the adjuster to adjust the parameter related to the flow path resistance of the positive pressure ink path and the parameter related to the flow path resistance of the negative pressure ink path such that a same prescribed amount of ink is ejected from each of the nozzles.

The inkjet head may include inkjet heads staggered in the row direction. The inkjet printer may further include a head unit including the inkjet head. Tthe positive pressure ink path may include positive pressure branch paths connected to the inkjet heads, respectively. The negative pressure ink path may include negative pressure branch paths connected to the inkjet heads, respectively. The head unit may be at least either rotatable around an axis extending in the direction parallel to the nozzle surface and orthogonal to the row direction, or be movable in the vertical direction including a movement in the state where the row direction is the non-horizontal direction, or be configured allowing individual movements of the respective inkjet heads along the row direction in the state where the row direction is the non-horizontal direction. The adjuster may adjust a parameter related to respective flow path resistances of the positive pressure branch paths and the negative pressure branch paths. At a time of printing, the controller may control the adjuster to adjust the parameter related to the respective flow path resistances of the positive pressure branch paths and the negative pressure branch paths based on height positions of the respective inkjet heads such that the nozzle pressure of each of the nozzles in the nozzle row in each of the inkjet heads is within the range enabling ink to be stably ejected and ink of a same flow rate flows at a flow rate required for each of the inkjet heads.

In a state where the row direction is a horizontal direction, the controller may perform purging for cleaning the inkjet heads in which ink is delivered from the positive pressure tank to the inkjet heads via the positive pressure ink path and is ejected from each of the nozzles in the inkjet heads. Upon performing the purging, the controller may control the adjuster to adjust the parameter related to the respective flow path resistances of the positive pressure branch paths and the negative pressure branch paths such that a same prescribed amount of ink is ejected from each of the nozzles in the inkjet heads.

The inkjet head may include: a first inkjet head configured to eject ink of a first color onto a printing medium being conveyed in a conveyance direction parallel to a horizontal direction; and a second inkjet head configured to eject ink of a second color different from the first color onto the printing medium being conveyed in the conveyance direction. The inkjet printer may further include: a first head unit including the first inkjet head; and a second head unit including the second inkjet head and arranged at a downstream of the first head unit in the conveyance direction.

The inkjet head may include: a first inkjet head; and a second inkjet head arranged at a position higher than a position of the first inkjet head. The printing may be performed in a state where the parameter related to the flow path resistance of the ink path is set such that an average nozzle pressure of the nozzles of the first inkjet head and an average nozzle pressure of the nozzles of the second inkjet head are the same.

A positioning adjustment of the inkjet head may be possible by at least either rotating the inkjet head around an axis extending in a direction parallel to a nozzle surface at which the nozzles are open and orthogonal to the row direction, or moving the inkjet head in a vertical direction including a movement in a state where the row direction is a non-horizontal direction, or moving the inkjet head along the row direction in a state where the row direction is the non-horizontal direction. The controller may control the adjuster to adjust the parameter related to the flow path resistance of the ink path in conjunction with the positioning adjustment.

A flow path resistance adjustment method in accordance with some embodiments of the present invention is a method of adjusting a parameter related to a flow path resistance of an ink path in an inkjet printer. The inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and the ink path connecting the ink tank with the inkjet head. The flow path resistance adjustment method includes adjusting the parameter related to the flow path resistance of the ink path such that a nozzle pressure of each of the nozzles at a time of printing is within a prescribed range enabling ink to be stably ejected and ink flows at a flow rate required for the inkjet head.

The inkjet printer may further include: an adjuster configured to adjust the parameter related to the flow path resistance of the ink path; and a controller configured to control the adjuster. The inkjet head may be capable of changing a height position thereof. The flow path resistance adjustment method may include causing the controller, at the time of printing, to control the adjuster to adjust the parameter related to the flow path resistance of the ink path based on the height position of the inkjet head such that the nozzle pressure of each of the nozzles is within the range enabling ink to be stably ejected and ink flows at the flow rate required for the inkjet head.

A printing method in accordance with some embodiments of the present invention is a printing method in an inkjet printer. The inkjet printer includes: an inkjet head having a nozzle row in which nozzles configured to eject ink are arranged, the inkjet head being configured to perform printing by ejecting ink from the nozzles in a state where a row direction of the nozzles in the nozzle row is a non-horizontal direction; an ink tank configured to receive a pressure for delivering ink to the inkjet head or for recovering ink from the inkjet head; and an ink path connecting the ink tank with the inkjet head. The printing method includes performing the printing in a state where a parameter related to a flow path resistance of the ink path is set such that a nozzle pressure of each of the nozzles is within a prescribed range enabling ink to be stably ejected and ink flows at a flow rate required for the inkjet head.

The inkjet printer may further include: an adjuster configured to adjust a parameter related to a flow path resistance of the ink path; and a controller configured to control the adjuster. The inkjet head may be capable of changing a height position thereof. The printing method may include: causing the controller, at a time of printing, to control the adjuster to adjust the parameter related to the flow path resistance of the ink path, based on the height position of the inkjet head such that the nozzle pressure of each of the nozzles is within the range enabling ink to be stably ejected and ink flows at the flow rate required for the inkjet head; and causing the controller to perform printing.

Embodiments of the present invention have been described above. However, the invention may be embodied in other specific forms without departing from the spirit or essential characteristics thereof. The present embodiments are therefore to be considered respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer comprising:

upper and lower inkjet heads each having a nozzle row in which nozzles configured to eject ink are arranged, each of the upper and lower inkjet heads being configured to perform printing by ejecting ink from the nozzles in a state where a row direction of the nozzles in the nozzle row is a non-horizontal direction;

head paths; and an ink tank connected with the upper and lower inkjet heads via the head paths, the ink tank configured to receive a pressure for delivering ink to the upper and lower inkjet heads via the head paths or for recovering ink from the upper and lower inkjet heads via the head paths, wherein flow-path resistance parameters of the head paths including at least one of the lengths of the head paths, the diameters of the head paths, the shapes of the head paths, or a pressure of the tank are set based on a water head difference between the upper and lower inkjet heads to generate a nozzle pressure of each of the nozzles at a time of printing that is within a prescribed range enabling ink to be stably ejected and to create ink flow at a flow rate required for the upper and lower inkjet heads, and printing is performed with the nozzles whose nozzle pressure is determined by the setting of the flow-path resistance parameters to generate a nozzle pressure of each of the nozzles that is within the prescribed range enabling stable ink ejection from the nozzles and creating the ink flow rate required for the upper and lower inkjet heads.

2. The inkjet printer according to claim 1, wherein the ink tank includes:

a positive pressure tank configured to store ink supplied to the upper and lower inkjet heads and to receive a positive pressure for delivering ink to the upper and lower inkjet heads; and a negative pressure tank configured to receive ink that has not been consumed in the upper and lower inkjet heads and to receive a negative pressure for recovering ink from the upper and lower inkjet heads, wherein the head paths includes:

a positive pressure ink path connecting the positive pressure tank with the upper and lower inkjet heads; and a negative pressure ink path connecting the upper and lower inkjet heads with the positive pressure tank, and a flow-path resistance of the positive pressure ink path and a flow-path resistance parameter of the negative pressure ink path are set to cause the nozzle pressure of each of the nozzles to be within the prescribed range, enabling the ink flow rate required for the upper and lower inkjet heads.

3. The inkjet printer according to claim 2, wherein the upper and lower inkjet heads each include inkjet heads arranged at different height positions, respectively, the positive pressure ink path includes positive pressure branch paths connected to the upper and lower inkjet heads, respectively, the negative pressure ink path includes negative pressure branch paths connected to the upper and lower inkjet heads, respectively, and the flow-path resistance parameters of the positive pressure branch paths and the negative pressure branch paths are set such that the nozzle pressure of each of the nozzles in the nozzle row in each of the upper and lower inkjet heads is within the prescribed range and ink of a same flow rate flows at a flow rate required for each of the upper and lower inkjet heads.

4. The inkjet printer according to claim 1, wherein the upper and lower inkjet heads:

are rotatable around an axis extending in a direction parallel to a nozzle surface at which the nozzles are open and orthogonal to the row direction in each of the upper and lower inkjet heads;

perform printing in a state where the row direction is a non-horizontal direction; and perform purging for cleaning the nozzle surface in a state where the row direction is a horizontal direction.

5. The inkjet printer according to claim 1, further comprising:

an adjuster configured to adjust the flow-path resistance parameters; and a controller configured to control the adjuster, wherein the upper and lower inkjet heads are configured to change their height position, and at a time of printing, the controller controls the adjuster to adjust the flow-path resistance parameters based on the height position of the upper and lower inkjet heads such that a nozzle pressure of each of the nozzles is within a range enabling ink to be stably ejected and the ink to flow at a flow rate required for the upper and lower inkjet heads.

6. The inkjet printer according to claim 5, wherein the ink tank includes:

a positive pressure tank configured to store ink supplied to the upper and lower inkjet heads and to receive a positive pressure for delivering ink to the upper and lower inkjet heads; and a negative pressure tank configured to receive ink that has not been consumed in the upper and lower inkjet heads and to receive a negative pressure for recovering ink from the upper and lower inkjet heads, wherein the head paths include:

a positive pressure ink path connecting the positive pressure tank with the upper and lower inkjet heads; and a negative pressure ink path connecting the upper and lower inkjet heads with the negative pressure tank, wherein the adjuster adjusts a flow-path resistance parameter of the positive pressure ink path and a flow-path resistance parameter of the negative pressure ink path, the upper and lower inkjet heads are at least either rotatable around an axis extending in a direction parallel to a nozzle surface at which the nozzles are open and orthogonal to the row direction, movable in a vertical direction including a movement in a state where the row direction is a non-horizontal direction, or movable along the row direction in a state where the row direction is the non-horizontal direction, and at a time of printing, the controller controls the adjuster to adjust the flow-path resistance parameter of the positive pressure ink path and the flow-path resistance parameter of the negative pressure ink path based on the height position of the upper and lower inkjet heads such that the nozzle pressure of each of the nozzles is within the range enabling ink to be stably ejected and enabling the ink to flow at the flow rate required for the upper and lower inkjet heads.

7. The inkjet printer according to claim 6, wherein in a state where the row direction is a horizontal direction, the controller performs purging for cleaning the upper and lower inkjet heads in which ink is delivered from the positive pressure tank to the upper and lower inkjet heads via the positive pressure ink path and is ejected from each of the nozzles, and upon performing the purging, the controller controls the adjuster to adjust the flow-path resistance parameters of the positive pressure ink path and the negative pressure ink path such that a same prescribed amount of ink is ejected from each of the nozzles.

8. The inkjet printer according to claim 6, wherein the upper and lower inkjet heads include inkjet heads staggered in the row direction, the inkjet printer further comprises a head unit including the upper and lower inkjet heads, the positive pressure ink path includes positive pressure branch paths connected to the upper and lower inkjet heads, respectively, the negative pressure ink path includes negative pressure branch paths connected to the upper and lower inkjet heads, respectively, the head unit is at least either rotatable around an axis extending in the direction parallel to the nozzle surface and orthogonal to the row direction, movable in the vertical direction including a movement in the state where the row direction is the non-horizontal direction, or configured to allow individual movements of the respective upper and lower inkjet heads along the row direction in the state where the row direction is the non-horizontal direction, the adjuster adjusts a flow-path resistance parameters of the positive pressure branch paths and the negative pressure branch paths, and at a time of printing, the controller controls the adjuster to adjust the flow-path resistance parameters related to the respective flow path resistances of the positive pressure branch paths and the negative pressure branch paths based on height positions of the respective upper and lower inkjet heads such that the nozzle pressure of each of the nozzles in the nozzle row in each of the upper and lower inkjet heads is within the range enabling ink to be stably ejected and enabling ink of a same flow rate to flow at a flow rate required for each of the upper and lower inkjet heads.

9. The inkjet printer according to claim 8, wherein in a state where the row direction is a horizontal direction, the controller performs purging for cleaning the upper and lower inkjet heads in which ink is delivered from the positive pressure tank to the upper and lower inkjet heads via the positive pressure ink path and is ejected from each of the nozzles in the upper and lower inkjet heads, and upon performing the purging, the controller controls the adjuster to adjust the flow-path resistance parameters of the positive pressure branch paths and the negative pressure branch paths such that a same prescribed amount of ink is ejected from each of the nozzles in the upper and lower inkjet heads.

10. The inkjet printer according to claim 1, wherein the upper and lower inkjet heads include:

first upper and lower inkjet heads configured to eject ink of a first color onto a printing medium being conveyed in a conveyance direction parallel to a horizontal direction; and second upper and lower inkjet heads configured to eject ink of a second color different from the first color onto the printing medium being conveyed in the conveyance direction, and the inkjet printer further comprises:

a first head unit including the first upper and lower inkjet heads; and a second head unit including the second upper and lower inkjet heads and arranged at downstream of the first head unit in the conveyance direction.

11. The inkjet printer according to claim 1, wherein the upper and lower inkjet heads include:

first upper and lower inkjet heads; and second upper and lower inkjet heads arranged at a position higher than a position of the first upper and lower inkjet heads, and the printing is performed in a state where the flow-path resistance parameters of the head path is set such that an average nozzle pressure of the nozzles of the first upper and lower inkjet heads and an average nozzle pressure of the nozzles of the second upper and lower inkjet heads are the same.

12. The inkjet printer according to claim 5, wherein positioning adjustment of the upper and lower inkjet heads occurs in response to at least either rotating the upper and lower inkjet heads around an axis extending in a direction parallel to a nozzle surface at which the nozzles are open and orthogonal to the row direction, moving the upper and lower inkjet heads in a vertical direction including a movement in a state where the row direction is a non-horizontal direction, or moving the upper and lower inkjet heads along the row direction in a state where the row direction is the non-horizontal direction, and the controller controls the adjuster to adjust the flow-path resistance parameters of the head paths in conjunction with the positioning adjustment.

13. A flow path resistance adjustment method of adjusting flow-path resistance parameters of head paths connecting upper and lower inkjet heads with an ink tank in an inkjet printer, each of the upper and lower inkjet heads having a nozzle row in which nozzles configured to eject ink are arranged, and being configured to perform printing by ejecting ink from the nozzles in a state where a row direction of the nozzles in the nozzle row is a non-horizontal direction, and the ink tank being configured to receive a pressure for delivering ink to the upper and lower inkjet heads via the head paths or for recovering ink from the upper and lower inkjet heads via the head paths, the method comprising:

adjusting at least one of the lengths of the head paths, the diameters of the head paths, the shapes of the head paths, or a pressure of the tank based on a water head difference between the upper and lower inkjet heads to generate a nozzle pressure of each of the nozzles at a time of printing that is within a prescribed range enabling ink to be stably ejected and to create ink flow at a flow rate required for the upper and lower inkjet heads; and printing with the nozzles whose nozzle pressure is a result of the adjusting operation, and is within the prescribed range enabling stable ink ejection from the nozzles and creating the ink flow rate required for the upper and lower inkjet heads.

14. The flow path resistance adjustment method according to claim 13, further comprising adjusting in advance flow-path resistance parameters of the head paths including at least one of the lengths of the head paths, the diameters of the head paths, the shapes of the head paths, or a pressure of the tank such that the nozzle pressure of each of the nozzles at the time of printing is within the prescribed range enabling ink to be stably ejected and enabling ink to flow at the flow rate required for the upper and lower inkjet heads.

15. The flow path resistance adjustment method according to claim 13, wherein the inkjet printer further includes an adjuster configured to adjust flow-path resistance parameters of the head paths including at least one of the lengths of the head paths, the diameters of the head paths, the shapes of the head paths, or a pressure of the tank and a controller configured to control the adjuster, and wherein the upper and lower inkjet heads are configured to change their height position, and the flow path resistance adjustment method further comprises causing the controller, at the time of printing, to control the adjuster to adjust the flow-path resistance parameters of the head paths based on the height position of the upper and lower inkjet heads such that the nozzle pressure of each of the nozzles is within the range enabling ink to be stably ejected and enabling ink to flow at the flow rate required for the upper and lower inkjet heads.

16. A printing method of performing printing in a state where flow-path resistance parameters of head paths connecting upper and lower inkjet heads with an ink tank in an inkjet printer are set, each of the upper and lower inkjet heads having a nozzle row in which nozzles configured to eject ink are arranged, and configured to perform printing by ejecting ink from the nozzles in a state where a row direction of the nozzles in the nozzle row is a non-horizontal direction, and the ink tank being configured to receive a pressure for delivering ink to the upper and lower inkjet heads via the head paths or for recovering ink from the upper and lower inkjet heads via the head paths, the method comprising:

printing with the nozzles whose nozzle pressure is determined by the setting of the flow-path resistance parameters to generate a nozzle pressure of each of the nozzles that is within the prescribed range enabling stable ink ejection from the nozzles and creating the ink flow rate required for the upper and lower heads in a state where at least one of the lengths of the head paths, the diameters of the head paths, the shapes of the head paths, or a pressure of the tank is set based on a water head difference between the upper and lower inkjet heads to generate a nozzle pressure of each of the nozzles that is within a prescribed range enabling ink to be stably ejected and to create ink flow at a flow rate required for the upper and lower inkjet heads.

17. The printing method according to claim 16, further comprising:

setting in advance the flow-path resistance parameters of the head paths such that the nozzle pressure of each of the nozzles at a time of printing is within the prescribed range enabling ink to be stably ejected and enabling ink to flow at the flow rate required for the upper and lower; and then performing printing.

18. The printing method according to claim 16, wherein the inkjet printer further includes an adjuster configured to adjust the flow-path resistance parameters of the head paths, and a controller configured to control the adjuster, wherein the upper and lower inkjet heads are configured to change their height position, and the printing method further comprises;

causing the controller, at a time of printing, to control the adjuster to adjust the flow-path resistance parameters of the head paths, based on the height position of the upper and lower inkjet heads such that the nozzle pressure of each of the nozzles is within the range enabling ink to be stably ejected and enabling ink to flow at the flow rate required for the upper and lower inkjet heads; and causing the controller to perform printing.

19. The inkjet printer according to claim 1, wherein the flow-path resistance parameters are set such that an average nozzle pressure of the nozzles of each of the upper and lower inkjet heads at a time of the printing is within the prescribed range enabling ink to be stably ejected and enabling ink to flow at a flow rate required for the upper and lower inkjet heads.

20. The inkjet printer according to claim 19, wherein the flow-path resistance parameters are set such that a pressure difference caused by the water head difference between the upper and lower inkjet heads is cancelled out.

21. The inkjet printer according to claim 1, wherein the ink tank is configured to receive a pressure for delivering ink to the upper and lower inkjet heads via, respectively, a positive pressure upper head path and a positive pressure lower head path of the head paths or for recovering ink from the upper and lower inkjet heads via, respectively, a negative pressure upper head path and a negative pressure lower head path of the head paths, the flow path resistance of the positive pressure lower head path is greater than the flow path resistance of the positive pressure upper head path at an upstream side of the upper and lower inkjet heads, and the flow path resistance of the negative pressure lower head path is smaller than the flow path resistance of the negative pressure upper head path at a downstream side of the upper and lower inkjet heads.

22. An inkjet printer comprising:

at least one inkjet head having a nozzle row in which nozzles configured to eject ink are arranged, the at least one inkjet head being configured to perform printing by ejecting ink from the nozzles in a state where a row direction of the nozzles in the nozzle row is a non-horizontal direction;

an ink tank configured to receive a pressure for delivering ink to the at least one inkjet head or for recovering ink from the at least one inkjet head; and ink paths connecting the ink tank with the at least one inkjet head, wherein the printing is performed:

in a state where parameters related to flow path resistances of the ink paths connecting the ink tank with two inkjet heads of the at least one inkjet head having a water head difference therebetween are set such that an average nozzle pressure of the nozzles of each of the two inkjet heads at a time of printing is within a prescribed range enabling ink to be stably ejected and enabling ink to flow at a flow rate required for the two inkjet heads; or in a state where parameters related to flow path resistances of the ink paths connecting the ink tank with two nozzles of a single inkjet head of the at least one inkjet head having a water head difference therebetween are set such that a nozzle pressure of each of the two nozzles at a time of printing is within a prescribed range, enabling ink to be stably ejected and enabling ink to flow at a flow rate required for the two nozzles.

23. The inkjet printer according to claim 22, wherein the printing is performed:

in a state where the parameters related to the flow path resistances of the ink paths connecting the ink tank with the two inkjet heads are set such that a pressure difference caused by the water head difference between the two inkjet heads is cancelled out; or in a state where the parameters related to the flow path resistances of the ink paths connecting the ink tank with the two nozzles are set such that a pressure difference caused by the water head difference between the two nozzles is cancelled out.

* * * * *